(12) United States Patent
Krippene

(10) Patent No.: US 8,459,930 B2
(45) Date of Patent: Jun. 11, 2013

(54) VERTICAL MULTI-PHASED WIND TURBINE SYSTEM

(75) Inventor: Brett C Krippene, Rimrock, AZ (US)

(73) Assignee: Brett C. Krippene, Rimrock, AZ (US)

( * ) Notice: Subject to any disclaimer, the term of this patent is extended or adjusted under 35 U.S.C. 154(b) by 0 days.

(21) Appl. No.: 13/488,400

(22) Filed: Jun. 4, 2012

(65) Prior Publication Data

US 2012/0288357 A1   Nov. 15, 2012

Related U.S. Application Data

(60) Division of application No. 12/834,722, filed on Jul. 12, 2010, now abandoned, which is a continuation-in-part of application No. 12/355,411, filed on Jan. 16, 2009, now Pat. No. 7,753,644, which is a continuation-in-part of application No. 11/608,658, filed on Dec. 8, 2006, now Pat. No. 7,488,150.

(60) Provisional application No. 60/766,003, filed on Dec. 29, 2005.

(51) Int. Cl.
*F03D 3/04* (2006.01)

(52) U.S. Cl.
USPC ............. 415/4.2; 415/4.4; 415/116; 415/127; 415/147; 415/220

(58) Field of Classification Search
USPC ....... 415/4.2, 4.4, 116, 127, 147, 220; 290/44, 290/55
See application file for complete search history.

(56) References Cited

U.S. PATENT DOCUMENTS

| | | | |
|---|---|---|---|
| 4,154,556 A * | 5/1979 | Webster | 415/4.4 |
| 4,433,544 A * | 2/1984 | Wells et al. | 60/641.12 |
| 4,457,666 A * | 7/1984 | Selman, Jr. | 415/203 |
| 4,508,973 A * | 4/1985 | Payne | 290/55 |

* cited by examiner

*Primary Examiner* — Ninh H Nguyen
(74) *Attorney, Agent, or Firm* — Alex R Hobson; Invention To Patent Services

(57) ABSTRACT

A rotational axis multi-phased wind turbine power generating system is disclosed. A differential pressure is created by utilizing the prevailing wind, and air from the prevailing wind is directed into air blades for the creation of power. Optimally, the air blades directly utilize the prevailing wind in combination with the created differential pressure to create power. An adjustable air scoop, adjustable exit drag curtain or barrier, orienting systems, and air flow directing dampers are disclosed.

22 Claims, 17 Drawing Sheets

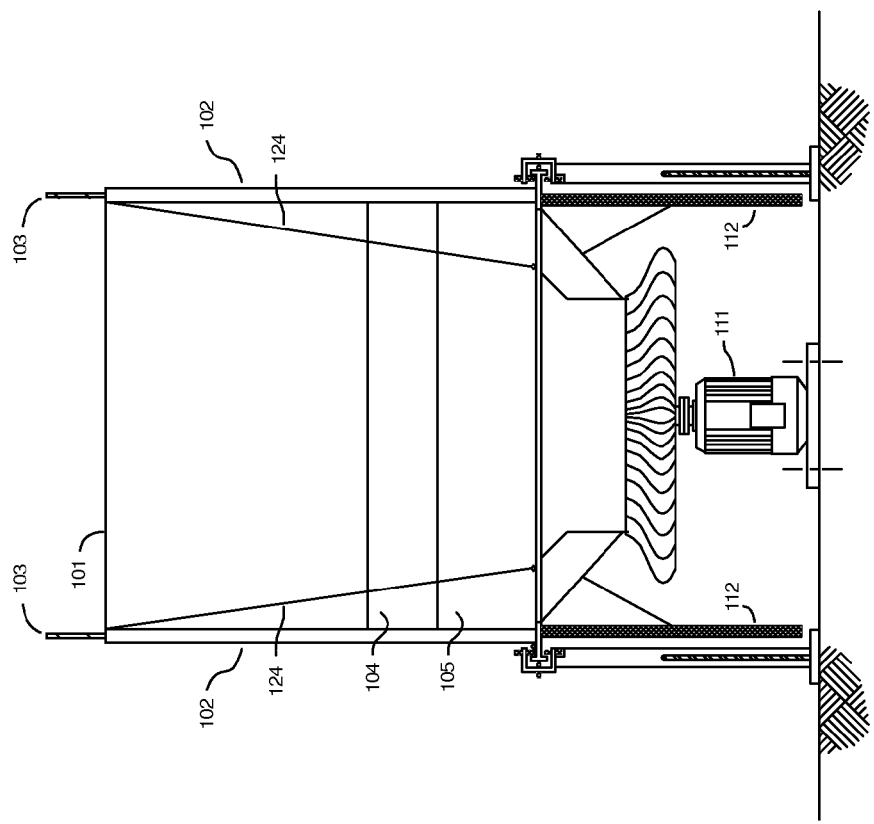
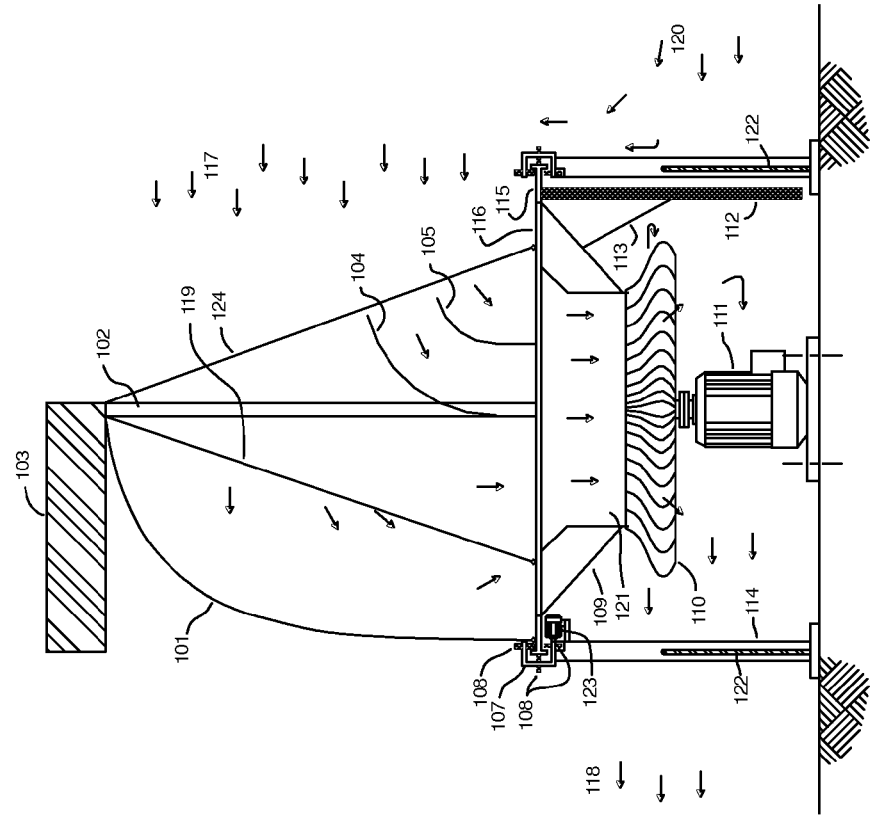

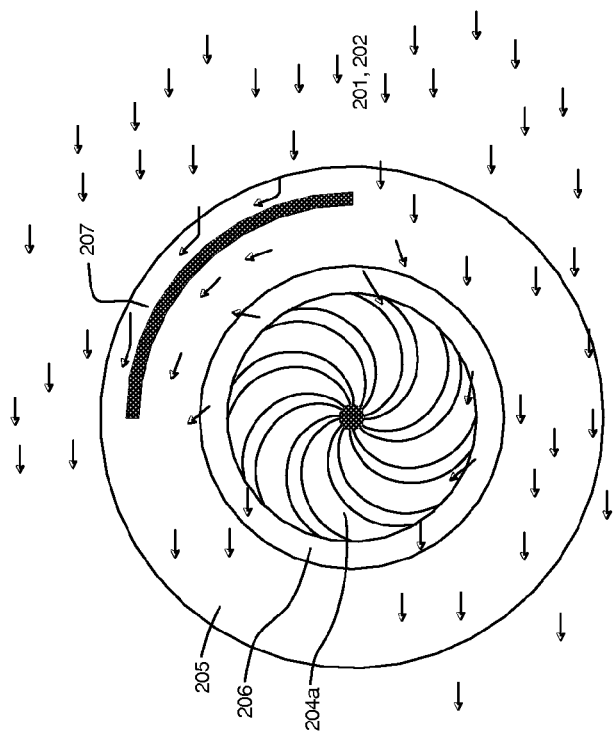
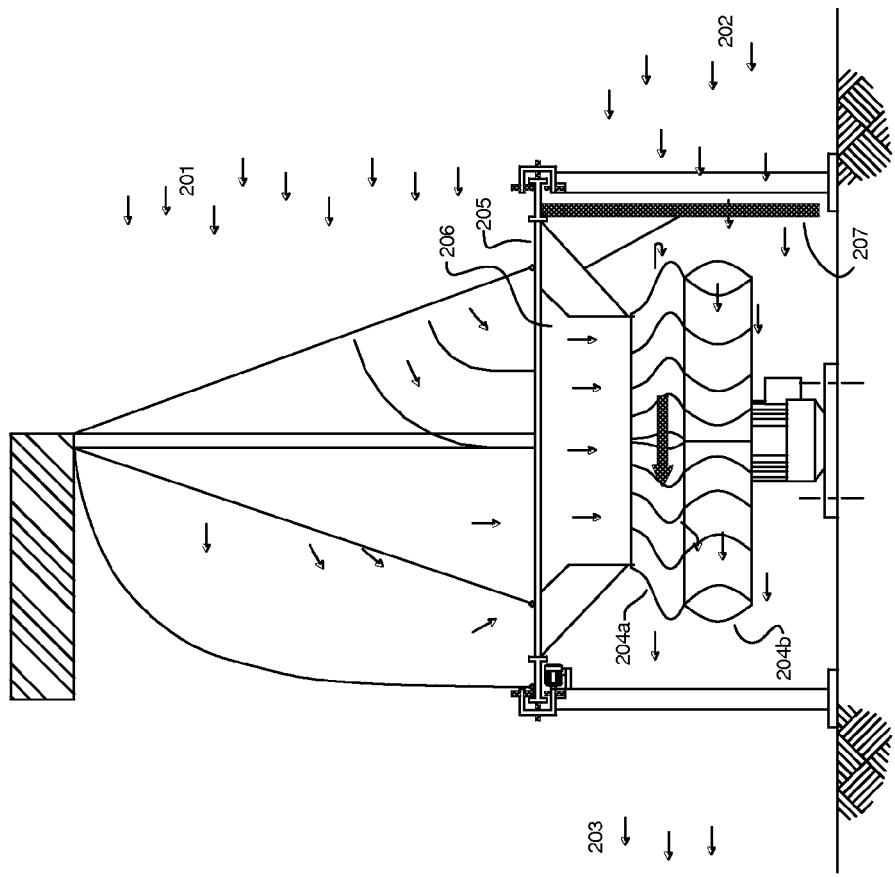
Fig. 2B
Fig. 2A

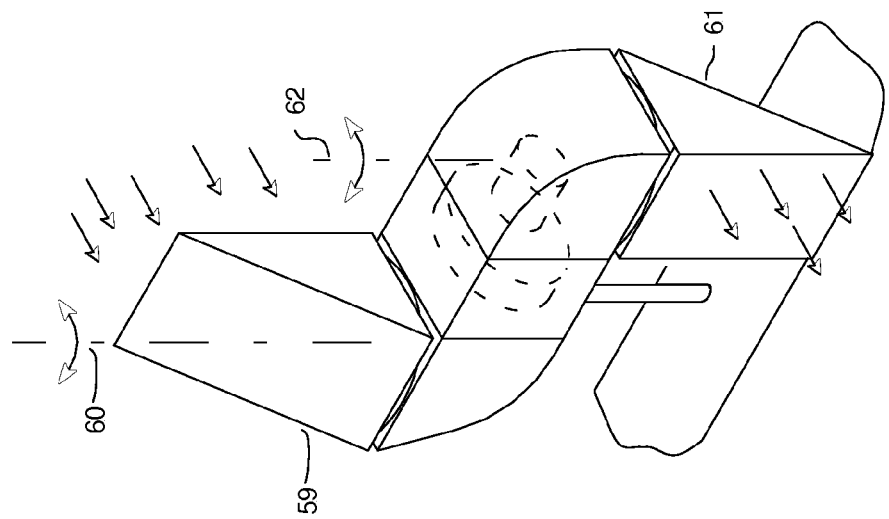
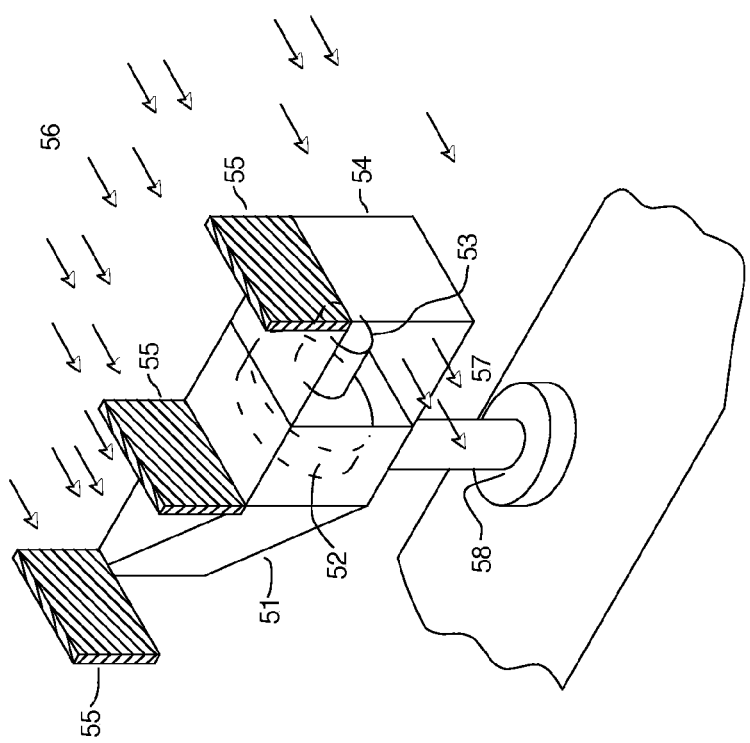
Fig. 5A
Fig. 5B

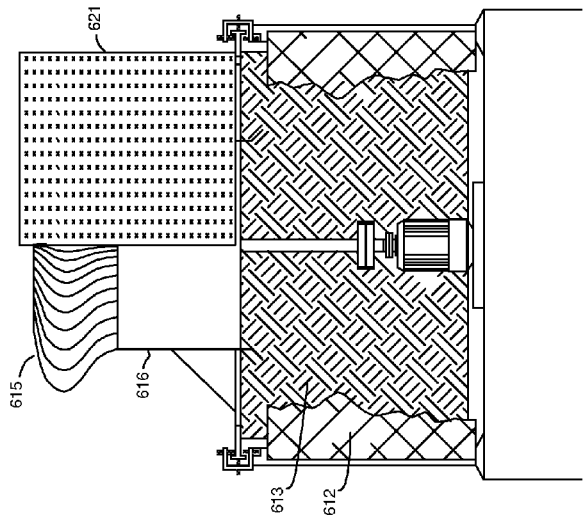
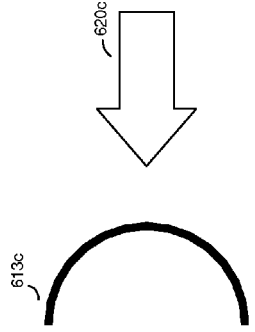
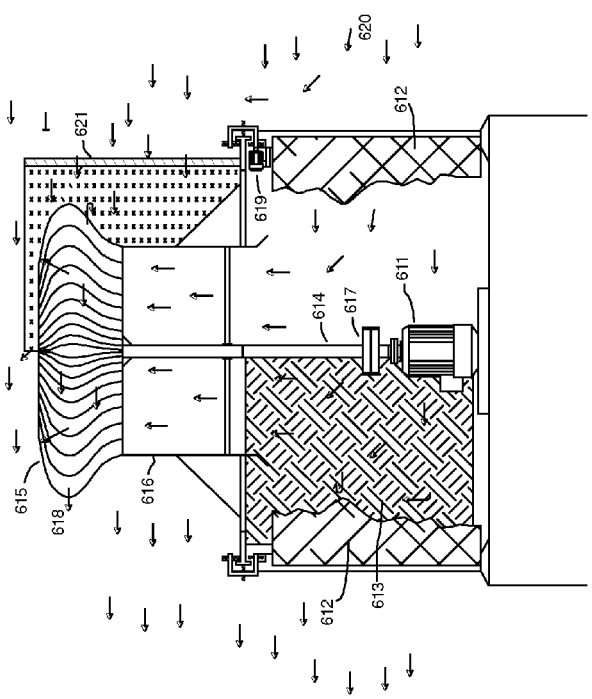
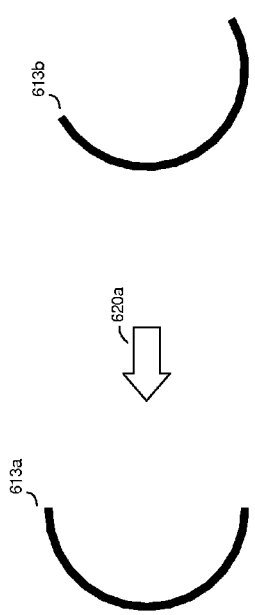
Fig. 6B
Fig. 6E
Fig. 6A
Fig. 6D
Fig. 6C

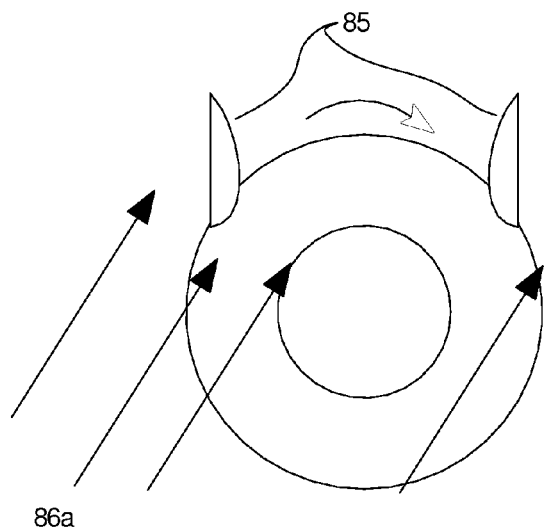
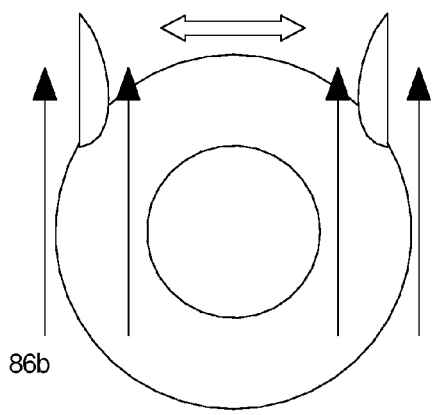
Fig. 8A  Fig. 8B
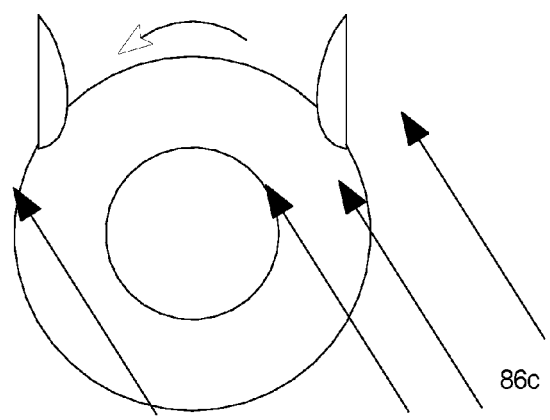
Fig. 8C

VERTICAL MULTI-PHASED WIND TURBINE SYSTEM

CROSS REFERENCE TO RELATED APPLICATIONS

This application is a divisional of U.S. application Ser. No. 12/834,722 filed on Jul. 12, 2010 now abandoned, which is a continuation in part of U.S. application Ser. No. 12/355,411, now U.S. Pat. No. 7,753,644, filed on Jan. 16, 2009 which is a continuation in part of U.S. application Ser. No. 11/608,658, now U.S. Pat. No. 7,488,150, filed on Dec. 8, 2006 which claims the benefit of U.S. Provisional Application No. 60/766,003 filed on Dec. 29, 2005. All of the prior non-provisional utility applications and provisional application are incorporated by reference herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This invention is directed toward wind driven power generating systems, in particular, wind driven power generating systems useful for the production of power, such as electricity. The present invention comprises an adjustable air scoop inlet section, an air turbine section of unique design, and an adjustable outlet section, which may include an adjustable drag curtain or outlet barrier for energy efficiency and system capacity considerations, to use the prevailing wind to produce power from the air turbine. The air turbine also utilizes a second phase of prevailing wind flowing through or around the outlet section to provide additional drive directly or indirectly to the turbine blades in a second stage of power production. The air turbine's exhaust flows into the outlet or exit section, which re-entrains the exhaust air into the downstream prevailing wind.

(2) Description of Related Art

There have been a number of patent applications and issued patents which are related to wind power generating systems. The most common commercial methods to date have been turbines with blades that are directly driven by the wind without a collector or wind concentrator. Horizontal axis (i.e. axis of rotation is horizontal) turbines are probably the most common with vertical axis systems also significant. These systems are simple, reasonably efficient, and commercially successful.

Wind power has surprisingly good economics and is capable of producing electricity at cost structure significantly less than 10 cents per kWh, commonly at 5-6 cents per kWh. Economics of wind power are constantly being studied and compared to existing methods of producing power which may be approximately 4 cents per kWh for large customers. This alternative energy production method has also been encouraged by tax incentives and special grants. There is now an expectation that each year increasing amounts of electricity will be generated by wind power, as well as other alternative energy based technologies.

Unfortunately, existing wind turbine designs have not been as widely adapted as is economically feasible. There are unforeseen problems with public reaction to the unsightly nature of the turbines and their visual dominance on a landscape, especially where there may be multiple installations of air turbines, often moving at different speeds and rotations with respect to each other, which may be viewed at the same time by a casual observer. There have been other issues. Existing wind turbines are often high off the ground, which increases maintenance costs due to poor accessibility. Some turbines have to reduce their operating speeds due to birds colliding with the turbine blades. There are infrastructure problems, where high voltage transmission lines are unavailable in favorable wind areas.

An example of a vertical axis turbine is described in U.S. Pat. No. 4,017,205 where a vertical turbine is integrated into a dome structure and the prevailing wind from any direction is meant to create an updraft. The goal is to create an upward force through a turbine which is useful for any wind direction. However, the practicality of the design is highly questionable. The air is not uniformly and forcibly directed through the generating turbine in a highly efficient and effective manner. The re-entrainment of the turbine exhaust air back into the wind is poorly thought out, and the lower directing, surface, would allow the turbine inlet air to flow easily around it horizontally without moving vertically.

Another example of the use of a vertical axis turbine is U.S. Pat. No. 4,309,146 where a vertical turbine is meant to be driven by a vertical airflow from a horizontal wind, which is directed upwardly by use of curved blades. An upper venturi creates a draft for the vertical air stream. The practical aspects of the design are highly limited. There is relatively little surface area where the wind is 'caught' and directed upwardly compared to the surface area of the power generating blades. The upper venturi, as illustrated, is poorly thought out from a flow re-entrainment and throughput standpoint as a large volume of horizontal wind is required to move a relatively small amount of vertical air. Moreover, as described in the previous paragraph; the vertical flow of air is not forced upwardly through the inner chamber. The draft is generated more from the venturi effect, which is known to be a weaker force. The airflow is more likely to move around the blades than be directed vertically.

Similar to the previously described patents, U.S. Pat. No. 4,365,929 discloses a vertical axis turbine that uses a building to 'catch' the wind and direct it vertically upward into the turbine. Various blades are installed on the building surface in a design attempt to force the air to flow upwardly into the turbine. The venturi design does not consider appropriate methods to re-entrain the turbine exhaust air back into the prevailing wind in an efficient manner, and the design is overly complicated. Additionally, as stated for previous patents, the air is not forcibly directed through the generating turbine, and the lower directing surface would allow the air to easily flow around it horizontally without moving vertically. As illustrated, the amount of surface area that is engaged with the prevailing wind compared to the complexity of the overall system is small. Also, the efficiency of the wind 'catch' and wind 'discharge' has not been carefully planned. Further, the building is a fixed size, and it is difficult to optimize the whole design when the wind 'catch' area is a constant size. Varying wind speeds require different surface 'catch' areas for efficient operation. It is less appealing to have the air intake close to the ground as the wind speed is lower.

U.S. Pat. No. 6,962,478 shows a vertical axis windmill that uses a unique outer wall with specially designed moving baffles to create a force on one side of the vertical rotating axis to cause rotation. However, the design of the air stream through the central opening of the framework and the closed baffles is inadequate. The surface area of the outer baffles far surpasses the ability of the framework to vent any air directed inside the framework.

U.S. Pat. No. 4,963,761 discloses a vertical axis fan turbine utilizing the prevailing wind to draw air upwardly through the turbine by a Bernoulli effect. As stated previously, a relatively large volume of air is needed to create the vacuum needed to draw a significant amount of air vertically, and the effect is not as efficient as other methods.

EP0003185 teaches the use of a large flexible canopy over a land area, such as a canyon, to create air movement through an air turbine. This design is not configured to catch a prevailing wind from any direction, and the simple structure is likely to be damaged in a high wind. The overly large design is meant to catch the movement of air from a thermal effect when the air is heated by the sun.

U.S. Pat. No. 4,116,581 discloses a windmill comprising a spherical structure that is divided into two hemispheres with the upper hemisphere rotating to catch the wind. One side of the upper hemisphere is cut away to direct the wind downwardly into the lower hemisphere and through a vertical axis air tube and turbine. An axial structure supports a shaft carrying a multi-bladed turbine of selected diameter centered in the air tube exit opening. The shaft is connected to a generator inside the axial structure. Only the air through the upper hemisphere provides power. No thought is given to providing a large exit space just after the turbine blades where the prevailing wind is allowed to enter and additionally generate power by rotating the turbine blades.

U.S. Pat. No. 993,120 discloses a vertical wind-mill which utilizes a vertical axis shaft, a casing having surface openings, a large cylinder with scoop-like vanes or blades mounted on a shaft, and the cylinder rotates to generate power. U.S. Pat. No. 4,017,204 describes wind motors which are propelled by the impact of the wind against the vanes of an impeller wheel, and wind channeling plates to gather the wind from a large area and funnel it at increased density and pressure to apply against the vanes. Again, in both of these patents no thought is given to providing a large exit space just after the turbine blades where the prevailing wind is allowed to enter and additionally generate power by rotating the turbine blades.

U.S. Pat. No. 6,952,058 discloses a wind energy conversion system, which includes upper and lower wind turbines having counter-rotating blade assemblies supported for rotation about a vertical rotation axis. A hood for supplying intake air to a wind turbine and an exhaust plenum for exhausting air from the wind turbine, with the hood and the exhaust plenum being directionally positioned is provided. U.S. Pat. No. 4,398,096 describes a wind-powered electric generator using a large opening/collector which routes the wind through an inner ducting and exhaust ducting in an "s" or "z" shaped flow. U.S. Pat. No. 4,516,907 discloses a wind collector with a side by side pair of power generators. None of these patents provides a large exit space just after the turbine blades where the prevailing wind is allowed to enter and additionally generate power by rotating the turbine blades.

BRIEF SUMMARY OF THE INVENTION

It is the intention of this invention to overcome the difficulties, problems, obstacles, visual, distaste, and poor economics of previous designs. The present invention uses an adjustable air scoop inlet section of variable geometry, an air turbine section of unique design, and an adjustable outlet section with variable geometry to utilize a first phase of the prevailing wind to provide power. The air turbine can also utilize a second phase of the prevailing wind as a second stage of power production from the air turbine. This wind, flowing directly through or around the air turbine and outlet sections in combination with the first phase of prevailing wind, can use either a full, or partial exit drag curtain or exit barrier or no drag curtain or barrier at all in order to provide additional power from the overall air turbine system. The air turbine exhaust enters the outlet section in a manner that re-entrains the exhaust air into the downstream prevailing wind under negative pressure by way of an adjustable exit drag curtain or exit barrier. Note: for the purposes of this patent application, the term "outlet section" and "exit space" are considered synonymous. Also, the term "phase" refers to the first and second phases of the prevailing wind as introduced to the system in its entirety, while "stage" refers to the first and second stages of air injection to the air turbine specifically.

BRIEF DESCRIPTION OF THE SEVERAL VIEWS OF THE DRAWING(S)

FIGS. 1A-1B shows an embodiment general arrangement of the invention.

FIGS. 2A-2I shows additional preferred embodiments of the system which include lower section enhancements to utilize in various ways the second phase portion of the prevailing wind.

FIG. 5A-5B shows how the present invention may be adapted for use as a horizontal axis turbine incorporating important for the air scoop and exit drag curtain.

FIGS. 6A-6B show another embodiment general arrangement of the invention.

FIGS. 6C-6E show how the inlet air scoop may be utilized to vary the air turbine power output by various rotations relative to the prevailing wind.

FIGS. 8A-8C show a self correcting method of orienting the air scoop relative to the prevailing wind by use of two opposing air foils without use of an auxiliary jogging mechanism.

FIGS. 9A-9C, 10, and 11 are embodiments of the present invention where various types of air turbines and air blades are used in to exploit air flow in a general "S" shaped flow pattern through the power generating system equipment.

Figure 11A:
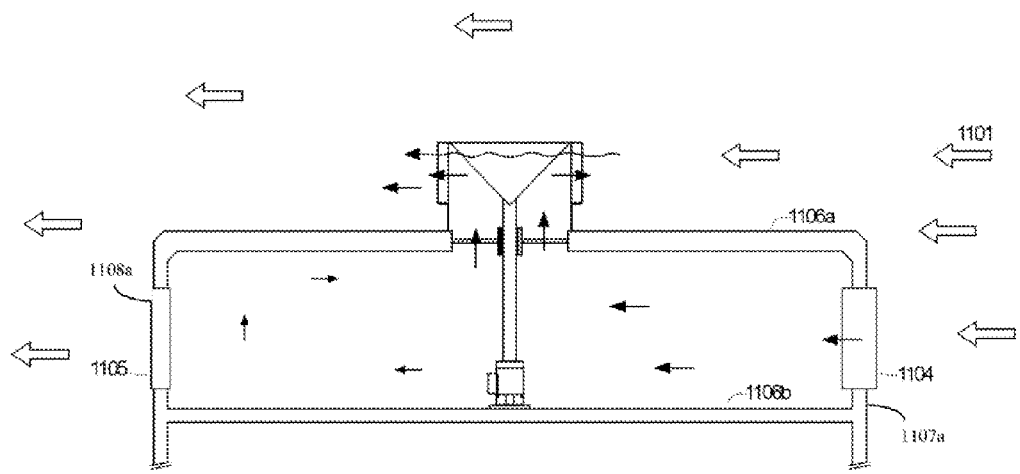
Figure 11B:
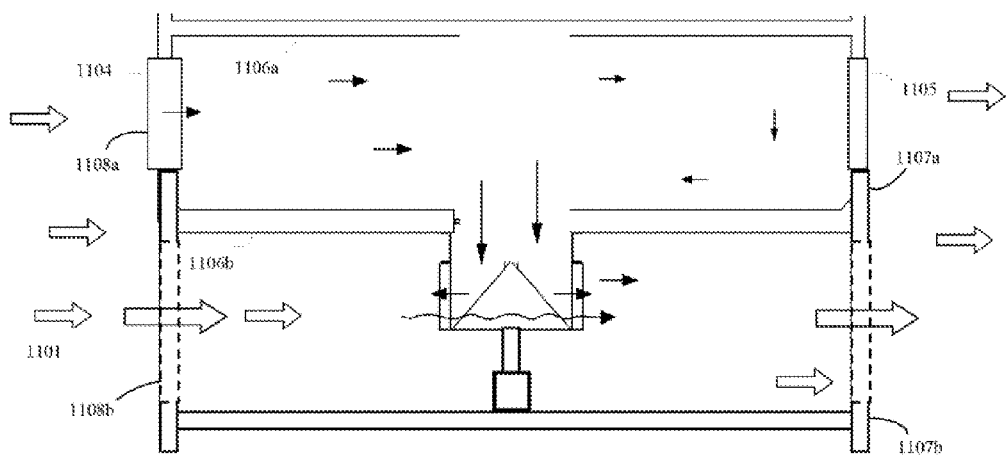

FIGS. 11A and 11B are side views of exemplary embodiments of a multi-phased wind turbine system, as described herein.

Figure 12:
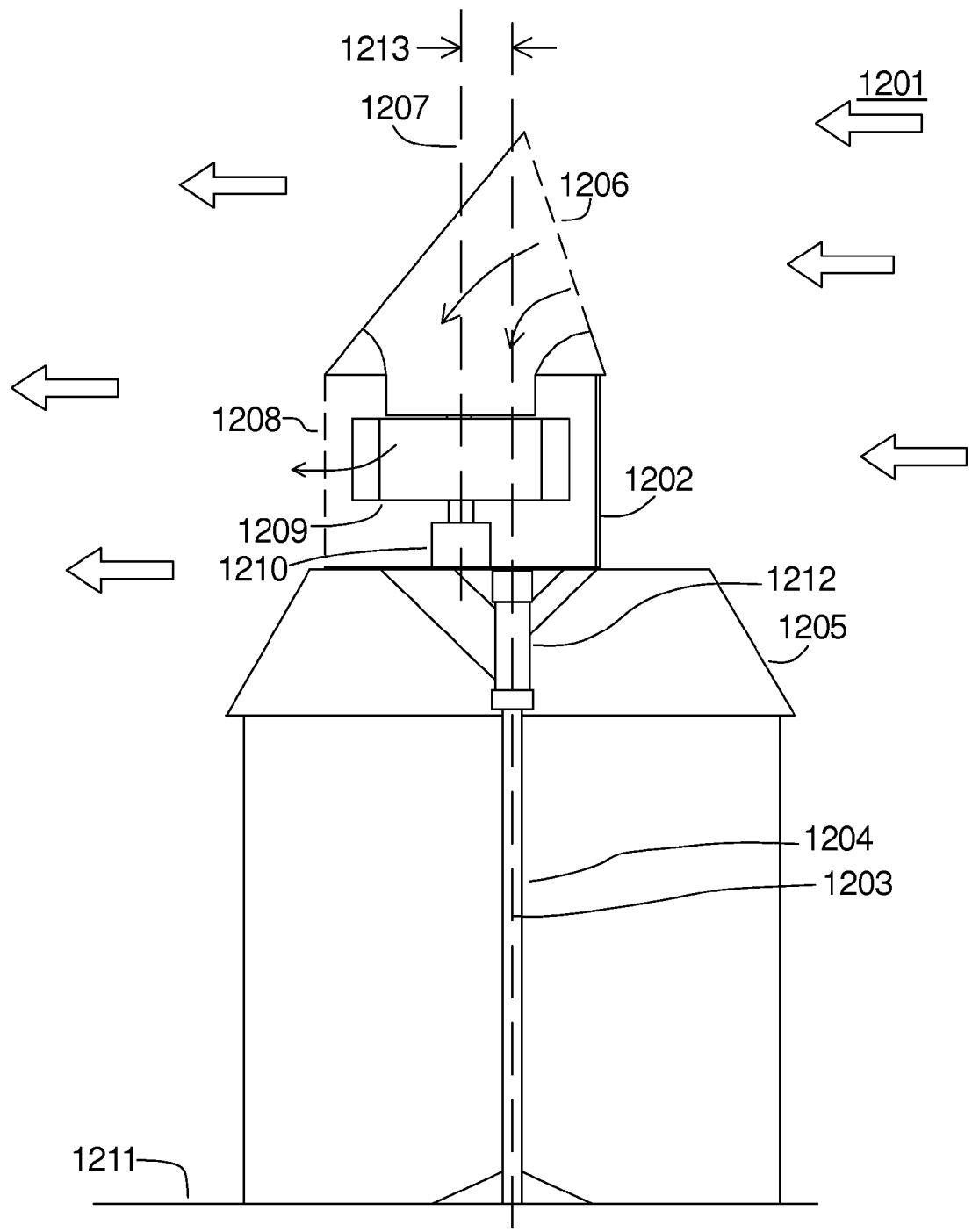

FIG. 12 shows an embodiment of the present invention of orienting the air scoop toward the prevailing wind.

Figure 13:
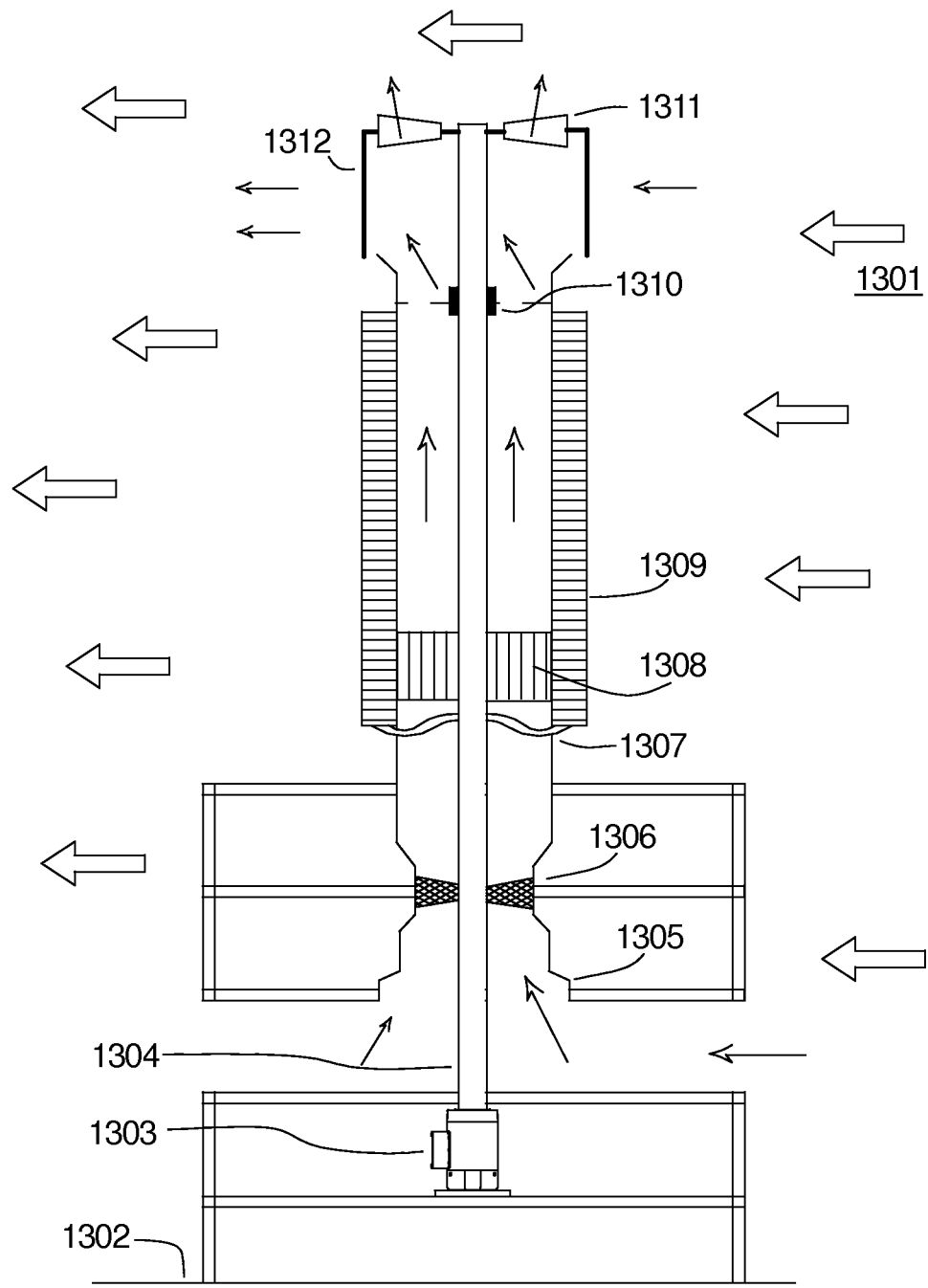

FIG. 13 is an embodiment of the present invention where the power generating equipment is staged on a roof in a split air turbine design where heating of the air flow is utilized.

DETAILED DESCRIPTION OF THE INVENTION

The present invention is a system designed to produce electricity at cost effective rates in an environmentally friendly manner at power outputs of approximately 0.10 to 50 kW. It is especially useful in areas where the wind velocity and turbulence increases in places that occur around small hills and tall buildings. It may be employed successfully in the heavily populated downtown sections of major cities. Multiple units can be utilized and may be sized for any given location as the opportunity may arise. Generally speaking, areas with average wind speeds of at least 12 mph are considered to be the most favorable locations for wind power.

FIGS. 1A-1B show two cross sectional views aft preferred embodiment, general arrangement of the invention. A large air scoop 101 made from a flexible material, such as used in the sailing industry, is hoisted above a vertical axis power generating turbine 110, 111 in order to utilize the upper prevailing wind 117 and direct the maximum air flow possible at maximum available velocity head pressure downward and through the integrated flow tube and power generating turbine assembly. The air scoop 101 is held in place by two masts 102 which are stabilized with suitable guy wires 119, 124 and are mounted on a circular rotating T-rail 115 and support cage assembly 116. A directing air flow tube 121 directs the incoming air flow and air pressure uniformly and downwardly into the turbine rotor assembly 110. The air from the flow tube 121 is routed most appropriately in a more or less radial direction from the inside to the outside edge of the reverse fan type turbine rotor assembly 110 which is connected to the power generator 111. The flow tube 121 is connected to the circular rotating T-rail 115 and support cage assembly 116 and both are held and stabilized in position relative to each other by three or more sector type support plates and struts 109. Additionally, and optionally, directing frontal air scoops 104, 105 are added to provide a more even air flow and pressure distribution into the flow tube 121. The air scoop 101 is positioned to optimally face the prevailing wind by the moment arm created between the center of the rotating air scoop assembly and the prevailing wind's force upon two stabilizing vanes 103 which are fixed to the two masts. The stabilizing vanes 103 will most naturally be positioned by this self correcting moment arm parallel to the direction of the prevailing wind. The stabilizing vanes also move the circular rotating T-rail 115 and support cage assembly 116 so that the air scoop 101 continuously faces directly into any useful amount of wind in an optimal manner. A small stand-off type support strut 124, projecting directly upwind from each of the two masts in parallel, extends the leading edge of the air scoop at the elevation of the T-rail and support cage assembly to the up-wind edge of the air tube assembly to increase the wind capturing effectiveness and efficiency of the air scoop. In one embodiment, the stabilizing vanes are air foils as described later.

A suitable design, as conceived in this invention, for the rotating T-rail 115 and support cage assembly 116 is a circular, 360° horizontal T or I beam ring type structure 115 which rotates within a vertical channel beam ring type structure 107 by means of the three or more rubber wheel type support assemblies 108. The rotating T-rail 115 and support cage assembly 116 also supports the air scoop, the flow tube and the exit drag curtain sections 112 of the vertical wind turbine assembly 110. The rotating T-rail also maintains their relative positions and alignments with respect to the incoming prevailing wind 117 and the vertical wind turbine assembly 110, 111 respectively. The floor of the support cage assembly 116 surrounding the flow tube inlet comprises a heavy duty hurricane fence, wire mesh type material that is designed for light foot traffic only. The wire mesh floor is in turn covered with a flexible material similar to that used on the air scoop 101 and exit drag curtain 112 assemblies to help direct the collected wind's air flow downwardly into the flow tube assembly. As an option, the inlet portion of the flow tube 121 may also be covered over with the same heavy duty hurricane fence type material used for the floor of the support cage type structure for safety considerations, if appropriate, but is not covered over with the flexible material. The inlet to the flow tube can be provided with a converging type conical or bell mouthed configuration to reduce the pressure losses through the flow tube.

The circular rotating T-rail 115 and support cage assembly 116 is held in place, yet is free to rotate horizontally by three or more stationary supporting structures, each of which is located more or less equally spaced around the outer periphery of the T-rail and support cage assembly and is detailed as follows. Multiple support posts 114 are firmly anchored to the ground and attached to the 360°, circular and stationary, half box channel support beam 107 with the three hardened rubber wheels 108 mounted at three or more equal spaced intervals around the stationary channel beam support structure. The T-rail 115 is contained by the three wheels 108 to only allow rotation of the circular rotating T-rail and support cage assembly in a horizontal plane 116. If necessary, an optional jogging motor 123 may be employed on one wheel to optimally orient the air scoop based on wind direction sensors, which are incorporated as part of the one or more stabilizing vane 103 assemblies. Alternatively, the T-rail system may be located at the bottom of the support cage assembly to provide a simpler, more cost effective design.

To prevent the lower prevailing wind 120 from adding back pressure to the turbine blades 110 and lowering overall efficiency, an exit drag curtain 112 or blocking plate (exit barrier) is attached to the circular mounting T-rail and support cage assembly. The exit drag curtain or exit barrier may be of a flexible sail cloth type material similar to that used for the inlet air scoop and suitably stiffened or backed up by a lattice work or ribbing, such as heavy duty hurricane fencing. The exit drag curtain 112 protects the area under the circular mounting T-rail and support cage assembly from the lower prevailing wind 120 for approximately 180° in circumference on the up-wind side. Stiffening gussets or struts 113 are used to provide additional stiffness to the exit drag curtain assembly 112 both to hold the desired shape of the exit drag curtain against the force of the prevailing wind and to prevent wind damage. The primary purpose of the exit drag curtain 112 is to prevent back pressure on the turbine blades and allow the turbine exhaust air to re-entrain with the downstream prevailing wind 118 in an efficient and slightly negative pressure manner.

In FIG. 1A, the air caught by the flexible air scoop 101 plus the inherent vacuum generating characteristics of the 180° circumference exit drag curtain 112 design create the total motive force for the preferred embodiment. Variations to this preferred design are discussed in other figures. These variations provide for additional enhanced power generation capabilities. These wind turbine power enhancements are a result of the various amounts of vacuum or negative pressure that can be created within and at the exit plane of the outlet section or exit space by various adjustments to the exit barrier or drag curtain. The amount of negative pressure depends on the physical construction of the air scoop and the shape of the exit drag curtain upstream of the air turbine exhaust, as well as the relative velocities realized throughout the invention. A larger air volume caught by the air scoop compared to the air flow through the turbine, along with an optimally designed exit drag curtain, creates an overall favorable differential pressure across the turbine and a higher power output. The drag curtain, where used, is designed to increase the negative pressure at the outlet of the turbine and in the exit space. For the purposes of this application, the term 'exit barrier' is used to refer to the drag curtain, and also refers to a less efficient barrier that is not designed to increase the negative pressure at the outlet of the turbine and exit space.

For protection and security of the overall system, an optional hurricane fence type enclosure 122 may be employed at ground level and incorporated into the support posts 114 in a manner that allows for free air flow.

FIGS. 1A and 1B do not show any details of the turbine blade design. The type of blade and number of blades is based on an engineering design that provides high efficiency for any given size and for the projected and prevailing wind conditions available for each site. However, at least one elongated blade that rotates about its center is necessary, and preferably there is a plurality of blades. The blade design must be highly efficient at extracting power from the air flow, such as commonly seen in various fan blade and turbine blade designs. A detail of the seal between the flow tube and turbine blades is not shown. However, the seal should be flexible and allow the blades to rotate in a safe and reliable manner without any significant loss of power resulting from air leakage around the turbine. It may be possible to align the equipment to a close tolerance with minimal clearance so that a mechanical seal is not necessary. Any seal system utilized should also provide a reasonable service life. The electrical generator system may be directly connected to the turbine blades, or a belt system may be used. Alternately, a gearing system may also be used.

In one embodiment, the flow tube and blades are aligned axially, but the fan blades are not inside the flow tube. That is, they are not within the volume defined by the geometry of the flow tube. The flow tube acts as a transitional piece to convey the air efficiently from the air scoop and to direct the air toward the air fan or air blades. In another embodiment, the air blades are within the flow tube.

The turbine blades may be a reverse flow "centrifugal fan rotor" type design and mounted on the discharge end of the flow tube assembly. This design can potentially exceed the Betz limit factor of 59.3% energy recovery of the available wind's air flow through the flow tube. The blades may be of a helical design, similar to turbine roof vents as used on top of buildings, such that the prevailing wind energy is imparted in multiple phases to the wind turbine in a multiple staged effect from both the inside and the outside of the wind turbine assembly. The "reverse flow fan design" means that most of the air flows from the inside smaller diameter of the fan rotor blades to the outside larger diameter of the fan rotor blades. The remaining air flow, powering the second turbine stage, comes from a second phase of the prevailing wind that enters through the exit section directly on to the periphery of the air turbine assembly, which is especially effective at generating power from the air turbine at lower wind speeds. The air turbine design may be of a combination backwardly-curved and air foil type blade configuration, such that the turbine exhaust air flows counter to the direction of rotation of the fan rotor assembly, so that the force of the air flow against the fan blades is on the reverse side of the blades. This causes the generator to rotate in a direction counter to the air flow discharging from the outer diameter of the reverse fan type air turbine rotor.

One embodiment of the present invention is to design the air turbine blades to be inherently over-speed limiting in relation to the speed or velocity of the prevailing wind. This can be accomplished to some extent by a careful selection of particular blade features. Another embodiment is to have a combination of air foil and bucket type turbine blade design features utilized in the air turbine blades so that both the highest and lowest wind speeds possible are most efficiently accomplished with a maximum range of wind speeds utilized. The bucket or impulse type design of air turbine blades provides for maximum torque at the lowest possible wind speeds, while an air foil type design of air turbine blades, provides for more optimum combinations of overall wind turbine performance and torque at the higher wind speeds.

Assuming a constant 28 mph prevailing wind speed, a suitable design for the flow tube internal diameter is approximately 10 feet in diameter, which will provide sufficient air flow to the turbine rotor to generate approximately 3,000 to 10,000 watts of useful power. The amount of useful power depends on the overall efficiency of the specific wind turbine, the turbine blade design and the type of electrical power system utilized for any specific application. Suitable gearing, pulley, and belt drive systems can be employed between the air blades and generator to provide normal generator rotational speeds. Additionally, a variable frequency type induction generator with a frequency converter could be used either alone or in combination with the mechanical rotational speed increasing type drive systems to accomplish the same purpose.

A low pressure loss protective screen made of the same heavy duty hurricane fence type construction used for the floor of the T-rail and support cage assembly can also be provided at the inlet to the flow tube or the air scoop, where necessary, to protect operating personnel, flying birds, etc. from being drawn into the turbine blades.

The cross sectional area ratio of the air scoop perpendicular to the prevailing wind and the turbine blade inlet section or flow tube section should be at least 1:1; and it could practicably be up to 6:1 depending upon the available wind energy. There is no maximum ratio, only a ratio that is practical and economical for each application and intended purpose. The air scoop is preferably adjustable in size, perhaps utilizing an auto sail rigging system, to vary the air scoop to flow tube cross sectional area ratio based on the available wind velocity. The air scoop size may be fixed for a given application, or it may be varied in shape-size to provide power based on wind conditions, such as average wind velocity and direction.

The present invention, which comprises of the air scoop inlet section, integrated flow tube and air turbine assembly section, and air outlet section which may contain an exit section blocking barrier or drag curtain may be of a variety of cylindrical and rectangular shapes. The materials of construction can be metal, wood, plastic (especially fiberglass), or fabric (i.e. sails, scoops, or curtains) of either a clear, transparent or opaque construction as is best suited for the environment where the present invention is to be installed. Various stiffening structures for rigidity may be employed, where appropriate or required.

The security fencing system, previously mentioned, may be employed to surround, yet be an integral part of the power generating structure that complies with any required code or regulation for public safety. The fence will protect the public from rotating parts and electrical components. A security fence has other known benefits. It is important, however, that the fence type enclosure structure does not hinder the air flow into the present invention in any significant way.

The present invention has a more pleasing, aesthetic appearance as it conceals the turbine rotating generating parts from public view. As contrasted to conventional, high visibility wind turbines mounted on towers, the present invention provides a more fixed geometry which has more of an appearance of a building with an air scoop or sail mounted on top and facing the wind rather than a mechanical windmill and support tower fluttering in the wind. In visibly sensitive areas, such as inside city limits or within visible sight from public transportation areas, the present invention clearly provides less eye disturbance.

The preferred embodiment shown in FIGS. 1A-1B does not have to be installed at the ground level. It is possible, and perhaps desirable, to install the invention on top of a building structure, such as a tall office building. If the structure is installed on the side of a hill, the orientation of the air scoop may need to be rotated about an axis that is substantially perpendicular to ground orientation. In this case, the concept of vertical would be relative to the ground orientation. Alternately, the angle may be somewhat misaligned relative to the ground orientation, but still substantially vertical.

The arrangement shown in FIGS. 1A-1B is a preferred embodiment. As an alternative, the air scoop is located below the vertical axis turbine and the exit drag curtain or exit barrier is located above it.

For easy installation in a variety of locations, the flow tube and circular rotating T-rail and support cage assembly may be shipped in two or more segments to facilitate transportation requirements and assembled in the field.

FIGS. 2A-2B show another embodiment of the power generating system. Again, a large air scoop made from a flexible material and shape is raised above a vertical axis power generating turbine as already explained for FIGS. 1A-1B. An upper prevailing wind 201 and lower prevailing wind 202 are used to generate electricity through power generating turbine blades 204a, 204b and exhaust the air into the downstream wind 203. However, in this embodiment, the upper turbine blade section 204a is connected to a lower turbine blade section 204b that is specifically designed to utilize the lower prevailing wind 202 to provide additional rotating force for power generation. Equally, the two blade sections could be designed to be integrated into one overall turbine blade section or assembly to obtain any desired performance requirement. FIG. 2B is an abbreviated top view which shows only the circular rotating T-rail and support cage assembly 205, the flow tube 206, the upper turbine blades 204a, and the top of the exit drag curtain 207. As shown, the exit drag curtain 207 has been reduced to provide only a 90° coverage and allow the lower prevailing wind 202 to become partially concentrated and to pass over only the lower turbine blade section or sections 204b on the down-spin side while producing additional drag on the up-spin side with improved, more effective exhaust air flow conditions accomplished from the air turbine. In this view, the turbine blade rotation is clockwise.

Figure 2C:
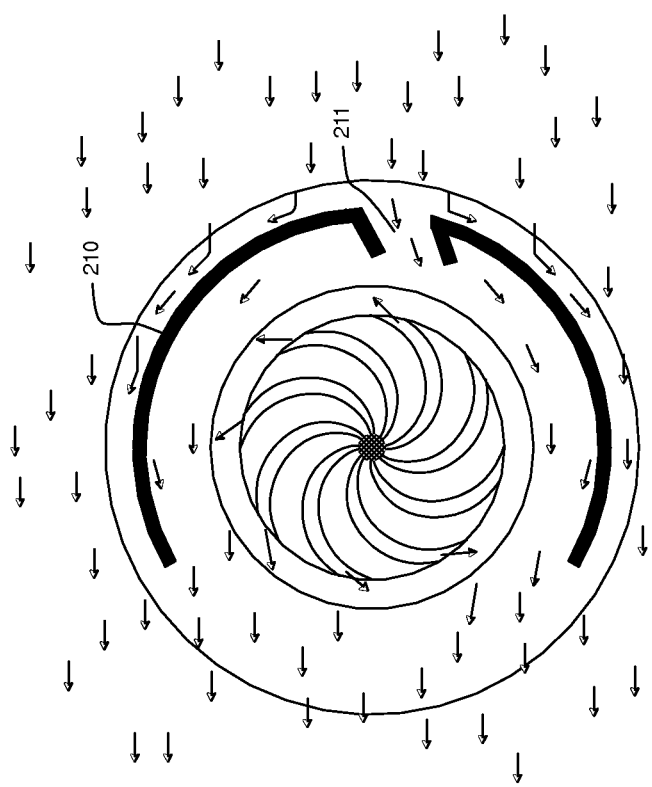
Figure 2D:
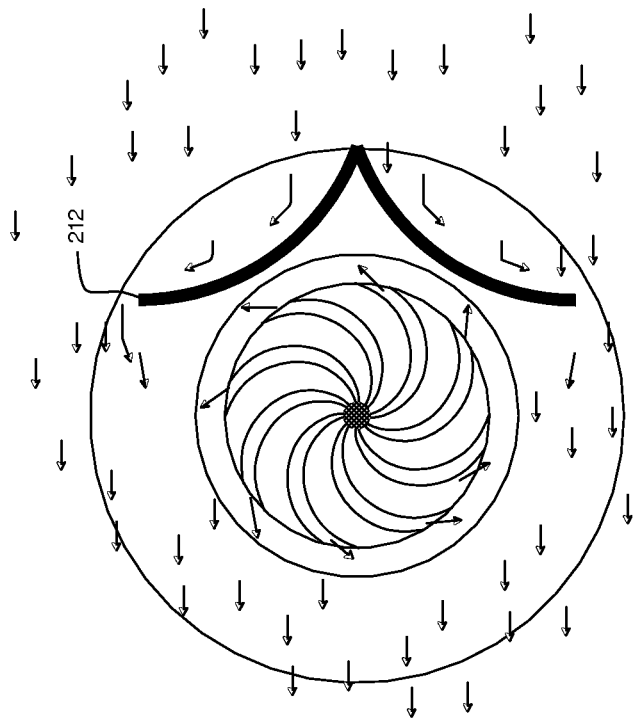
Figure 2F:
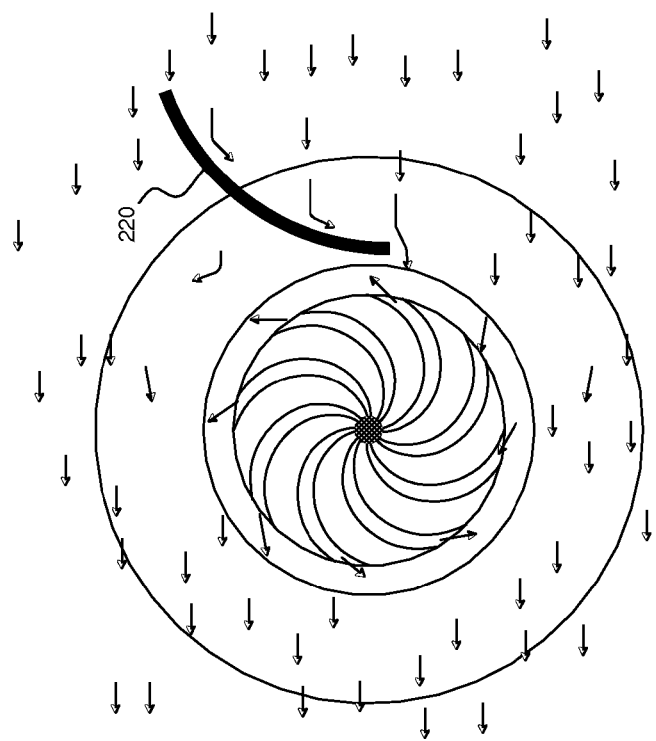
Figure 2E:
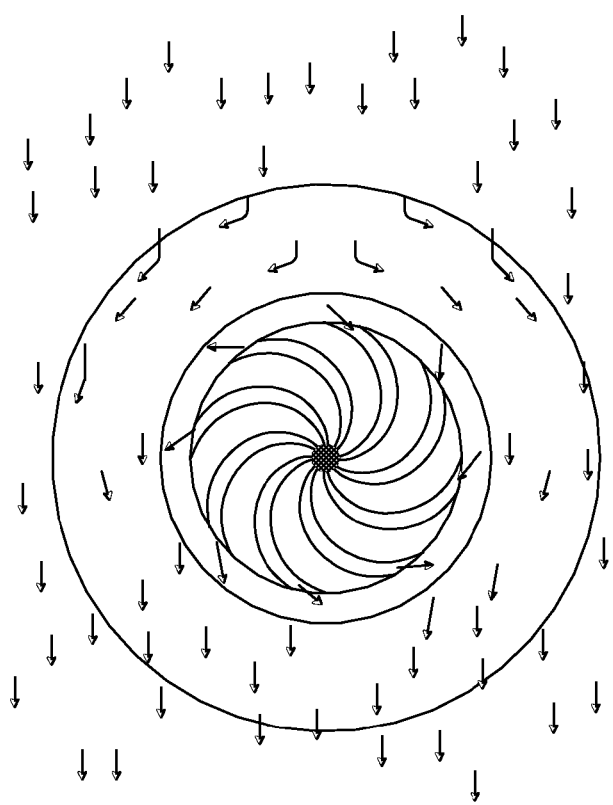

Similarly to FIG. 2B, FIG. 2C shows an exit drag curtain 210 containing a slotted type air injection nozzle 211 which has been formed to direct a concentrated air jet from the prevailing wind onto the downspin outer periphery of the air turbine, yet wraps the upstream side of the air turbine assembly with more than a 180° arc in a more air form manner. FIG. 2D shows another exit drag curtain 212 geometry with potential use in some applications. FIG. 2E shows the projected air flow pattern if no exit drag curtain is used and the air turbine blades are designed to utilize the lower prevailing wind in addition to the air provided by the air scoop. FIG. 2F shows another possible exit section or space-partial drag curtain 220 geometry.

Figure 2G:
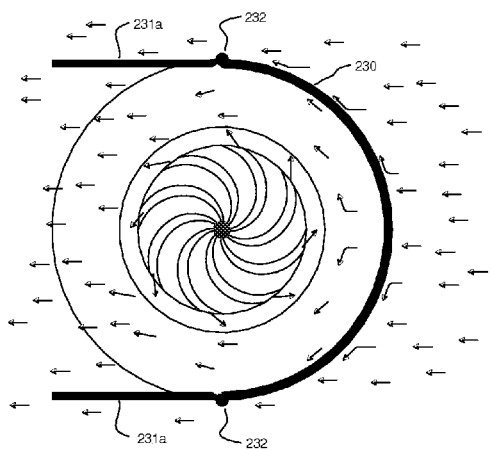
Figure 2H:
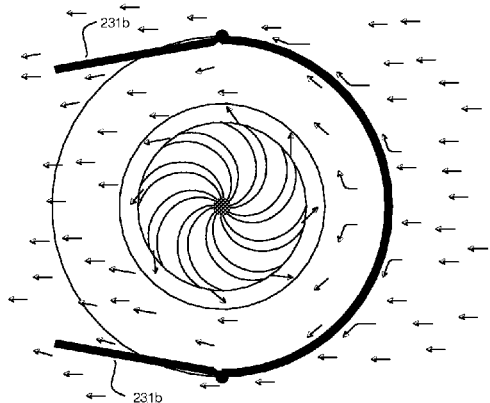
Figure 2I:
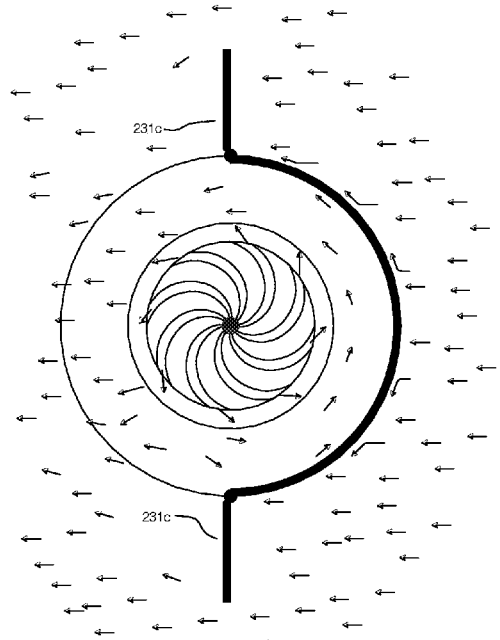

Similarly, FIGS. 2G, 2H, and 2I show another embodiment of the exit drag curtain in plan view 230, 231a which has an adjustable, variable geometry type design to change the exit drag curtain's drag coefficient either manually or automatically, as required. A curved, fixed portion 230 is attached to two straight portions that are parallel to each other 231a and connected by hinges 232. FIG. 2H shows the straight portions 231b which have been slightly directed inward from the parallel position, toward the center of the exit space on each side. An angle of 10° inward from the parallel position, as illustrated, may be advantageous in some wind conditions to create a more air form type drag effect. The angle could also be varied by mechanical means to as much as 90° outward from the parallel position, to the position 231c as shown in FIG. 2I, on each side to accomplish a "bluff body," also referred to as a flat plate or collar, type drag effect of the drag curtain according to the prevailing wind velocity. In these cases, the exit curtain has a variable geometry, and can be varied or adjusted dynamically when the winds change or whether a particular geometry provides appropriate optimum power for a given wind condition.

Figure 3A:
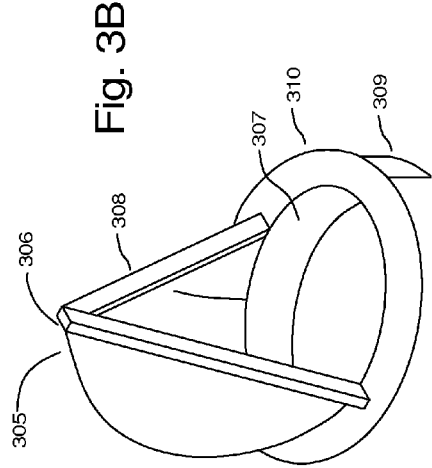
FIGS. 3A-3H illustrate several air scoop geometry shapes and exit drag curtain arrangements as mounted on a rotating circular T-rail and support cage assembly.

FIGS. 3A-3D show alternate arrangements of the air scoop and exit drag curtain. FIG. 3A shows the air scoop as outlined in the embodiment shown in FIGS. 1A-1B, except the flexible air scoop 301 lower edge matches the opening of the flow tube 302. The exit drag curtain 304 covers a 210° arc around the power generating area with enhanced power generating effect and, as previously illustrated, is attached to the circular rotating T-rail and support cage assembly 303.

Figure 3B:
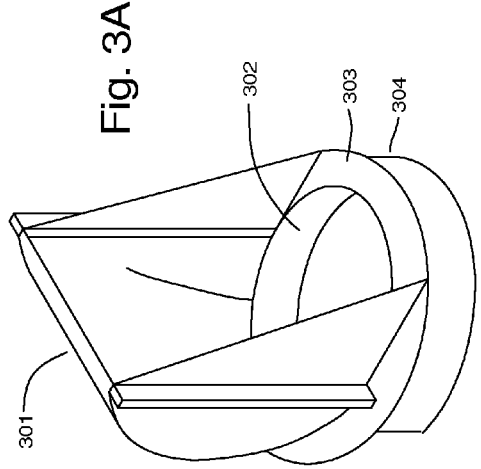

FIG. 3B shows an embodiment where the flexible air scoop 305 terminates at substantially a single point 306 above the flow tube opening 307 and utilizes an A-Frame mast 308. The lower exit drag curtain 309 only covers a 90° arc around the power generating area under the rotating circular T-rail and support cage assembly 310.

Figure 3C:
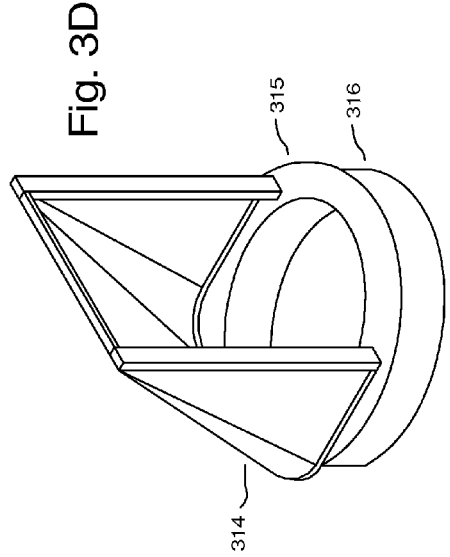

FIG. 3C shows an embodiment where the air scoop is a multiple hinged awning 311 that may be raised to a suitable height on the circular rotating T-rail and support cage assembly 312. The lower exit drag curtain 313 covers a 120° arc around the power generating area. The flexible air scoop illustrated in FIG. 3C does not have to be made from a flexible material. Rigid material could also be used to create the air scoop and still provide the variance in shape and size needed for optimal power generation. There could also be more than the two multiple awning sections 311 illustrated, and they may all be a different shape.

Figure 3D:
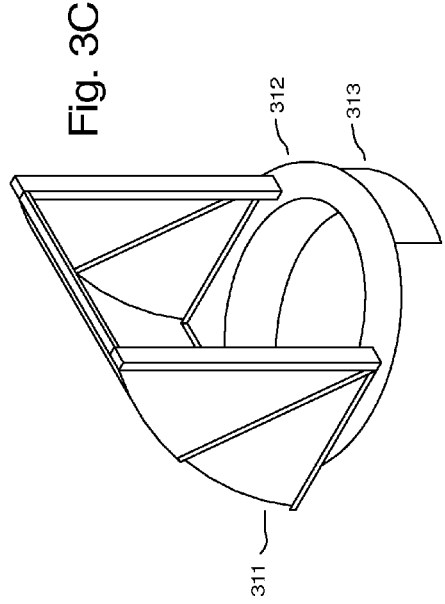

In FIG. 3D the flexible air scoop 314 is substantially triangular in style and mounted on the rotating circular T-rail and support cage assembly 315. The lower exit drag curtain 316 is wrapped in approximately a 270° arc, and is aerodynamically formed around the power generating area with the intent being to create a maximum vacuum type effect at the outlet of the air turbine to enhance the output power capability.

Figure 3F:
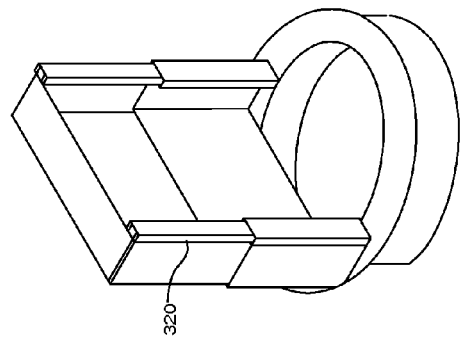
Figure 3H:
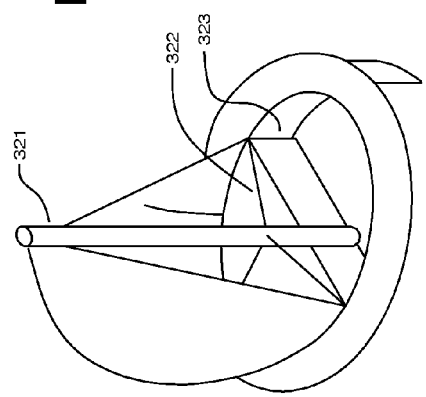
Figure 3E:
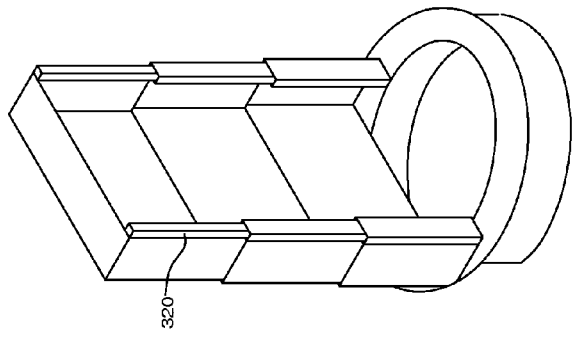
Figure 3G:
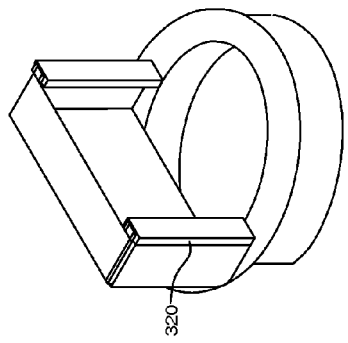

In FIG. 3E, the adjustable air scoop is supported by two telescoping masts 320 of adjustable height. The air scoop is shown configured for collecting wind when the prevailing wind speed is low or more turbulent. In FIG. 3F, the same adjustable air scoop is reduced in size by partially lowering the telescoping masts and scoop sections. The air scoop is then configured for collecting wind when the prevailing wind speed is moderate. In FIG. 3G the same adjustable air scoop is reduced to a minimum size by completely lowering the telescoping portions of the masts and scoops. The air scoop is then configured to collect wind when the prevailing wind speed is very high. Alternatively, sailboat type sails could be used here that could be "let in" or "let out" as desired or required, and the sails could be rolled up as appropriate with most sailing vessels.

FIG. 3H shows an embodiment where the flexible air scoop is supported by a central vertical mast 321 which is, in turn, supported by gussets 323 or guy wires 322. In this case, the rigging may be similar to sailboat rigging, and used to raise and lower the flexible air scoop.

Figure 4B:
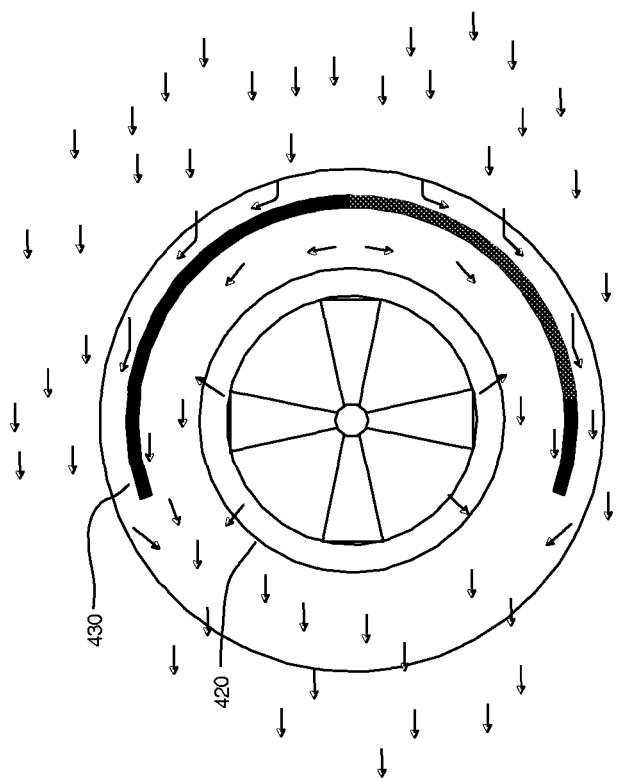
FIGS. 4A-4B show an embodiment where the turbine blades are located within an air flow tube.
Figure 4A:
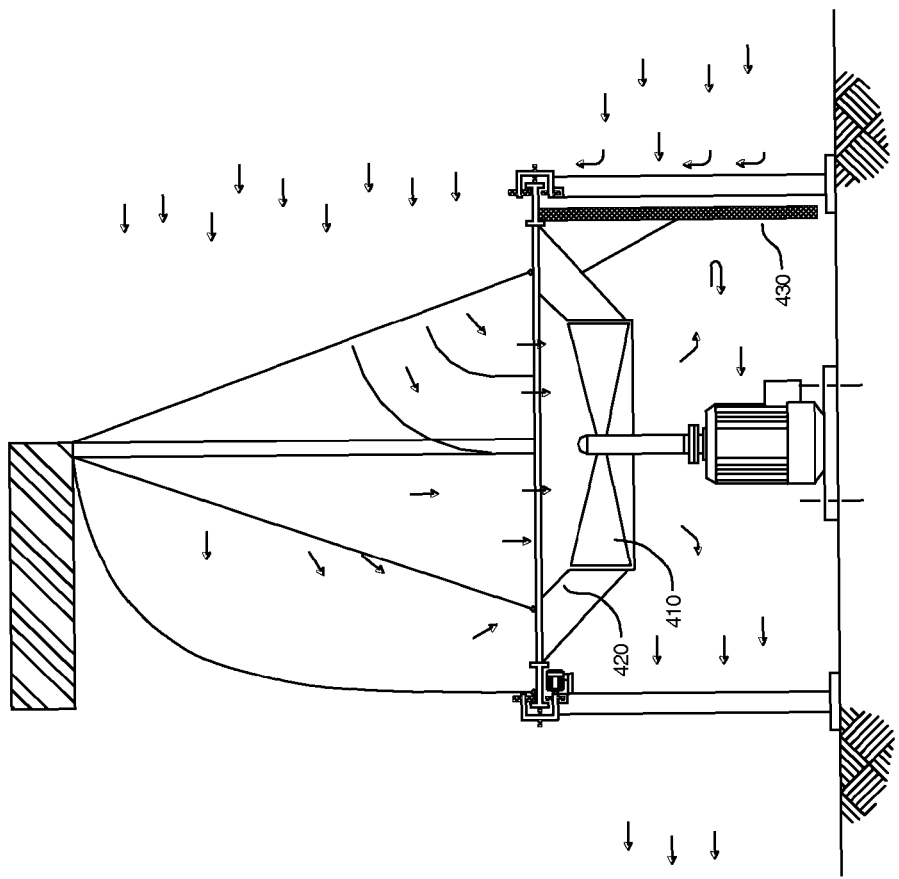

In FIGS. 4A-4B, a cross section of the present invention, similar to FIGS. 2A and 2B is shown where a propeller 410 is located within the flow tube 420. This simplified design is a lower capital cost, but provides lower efficiency and capacity. FIG. 4B shows the exit drag curtain 430 with 208° arc coverage. This arc coverage is a preferred embodiment and provides an optimum design in some situations.

Optionally, the exit drag curtain may be fixed to the direction of the prevailing wind, and may be varied in size rather than rotated with the air scoop. For example, the exit drag curtain may be provided in adjacent and over-lapping damper or louver type segments on vertical axis orientated support shafts that are each opened and closed through a mechanical means to provide a similar end result to rotating a fixed geometry curtain with the air scoop.

The exit drag curtain, or exit barrier, as described in the present invention, is designed to utilize the air drag effect created by the upstream air flow from the prevailing wind around the exit drag curtain. Conversely, exit barriers could also be used in certain applications as wind concentrators when located on the upstream side of and in parallel with the air turbine blades in the second phase of the prevailing wind. The average or bulk velocity of the exit air, after being exhausted from the air turbine through the exit air space, is lower than the average prevailing wind velocity. The entrainment between the two air streams can thus be designed to occur in an efficient manner by an appropriate exit drag curtain design which incorporates the most optimal drag effect possible from the prevailing wind to create a slight vacuum or negative pressure within the exit section or exit space at the point of re-entrainment.

One distinct advantage of the present invention is the ability to regulate the amount of air that is brought through the turbine air blades, and to regulate the power output. It is desirable to maintain power production in a high speed wind by reducing the size of the air scoop. The amount of air throughput can easily be reduced with or without the air turbine system being in operation to prevent over-speeding of the turbine blades. It is also desirable to design the size of the air scoop to match a particular location. For example, if there is a lower amount of average wind, the air scoop size may be enlarged. In this way, an optimization may be more readily found in a variety of locations utilizing a more standardized turbine design.

The power generated from the prevailing wind energy may be employed in creating compressed air, hydraulic pressure, pumping water, or reciprocating motion. It is not a requirement that the system is employed to generate electricity. However, electrical generation is a preferred embodiment.

The present invention may be adapted to smaller operations that utilize wind energy for the creation of needed power. For example, the teachings of the present invention may utilize existing structures as an air scoop and direct the air flow through a vertical axis turbine. A sailboat, for example, may use the wind pressure on the sail and direct a small portion of the air captured by the sail through a vertical axis turbine. The inlet section would be an inlet duct on the upwind side of a sail, and the outlet would be ducted to the down wind side of the same or other sails on the vessel. The inlet section, outlet section, and associated ductwork could be of a fixed or flexible design, and could then be routed to some convenient location where the turbine would be located. This same air flow could also be used to ventilate below deck quarters within the sailing vessel in series with the air turbine system through a suitable duct type system. This same concept could also be utilized on a non-powered barge type vessel. The power generating system could be used to charge batteries for general sailboat or barge power, or to power a small auxiliary electric outboard motor.

A prevailing wind exit drag curtain to protect the air exhaust space, or exit space, downstream of the air blades is not necessarily a requirement of the present invention. However, it provides an important improvement in operational efficiency and enhanced capacity. In some cases, operational efficiency and enhanced capacity is not a paramount concern, such as in a remote area where the power need is infrequent.

FIG. 5A shows another embodiment of the present invention and is preferred in some situations. A rigid air scoop 51 directs air from the prevailing wind 56 horizontally through air blades 52 which drive a power generator 53. An exit blocking curtain 54, similar to the inlet air scoop in design, but rotated approximately 180 degrees from the direction of the prevailing wind, protects the turbine air exit space and allows the exit air 57 from the turbine air blades to reenter the prevailing wind in an optimal manner. Stabilizing or directional air vanes which may or may not be of an opposing air foil design 55 cause the entire structure to rotate on a rotating base 58 based on the prevailing wind direction, to keep the air scoop 51 facing the prevailing wind. Alternatively, a Fechheimer type—highly directionally sensitive—velocity sensing probe could be used to help optimize the position of the air scoop and drag curtain via an air scoop jogging motor relative to the prevailing wind. This structure may be useful for smaller power generating systems.

Similarly, FIG. 5B shows another embodiment where the air scoop 59 is oriented vertically and allows rotation about the vertical axis 60 as illustrated. This air scoop can easily be directed to face the prevailing wind via a jogging motor. The exit drag curtain arrangement 61 comprises a second air scoop type structure which also rotates about a vertical axis 62, but always discharges in the downwind direction of the prevailing wind. Other wind blocking arrangements, such as illustrated in previous figures, could also be employed.

The air turbine does not necessarily need to be of a vertical axis-down-flow design to work cost effectively and efficiently. However, the air scoop section should always face into the wind, and the outlet drag section should most desirably face away from the prevailing wind in a multiple wind phased, multiple turbine staged wind energy effect for optimum wind turbine system effectiveness and power capacity.

Data from a test rig, where a prevailing wind was captured by a combined air scoop and exit drag curtain system designed according to the teachings of this invention, is shown in a table below. The test rig was designed so as to direct the captured air flow downward from the adjustable inlet air scoop into a vertical duct, turned 90° into a horizontal duct or air tube where the air velocity was measured, and then turned 90° again into an adjustable exit drag curtain configuration which discharged in the downwind direction from the prevailing wind. Air velocity measurements were made using a rotary vane type wind meter and a hot wire anemometer of the prevailing wind and the air in the horizontal duct or air tube respectively and simultaneously:

| Prevailing Wind Velocity (fpm) | Horizontal Air Tube or Duct Flow Velocity (fpm) |
| --- | --- |
| 411 | 641 |
| 521 | 652 |
| 554 | 563 |
| 810 | 837 |
| 818 | 906 |
| 623 Avg. | 720 Avg. |
| Increase | 16% |

Great care was taken to ensure that both meters were reading comparable wind velocities when placed side by side during the hot wire anemometer to wind meter calibration exercise and just prior to inserting the hot wire anemometer into the horizontal flow tube. Higher air-tube to wind air velocity differentials recorded were discarded due to non-uniform wind speeds or gusts prevalent at the time these readings were taken.

Surprisingly, the measurements show that the air velocity in the air tube could be consistently increased to above the velocity of the prevailing wind when directed to the horizontal duct, demonstrating that there was no significant loss of wind energy. One readily concludes that there is no significant loss of available, energy in the duct air flow when compared to the available energy in the prevailing wind. One also concludes that the combined inlet air scoop and downstream exit drag curtain system is highly effective in capturing the available wind energy in a multiple phased or multiple staged manner. The credibility of this experimental evidence was also verified by various flow computational methods, which are known in the art.

The exit drag curtains provide concentration of the energy available from the lower or second phase of prevailing wind upstream of the air turbine assembly. They also enhance the available pressure drop across the air turbine blades. This is done by the inherent vacuum creation or drag effect of the lower prevailing wind's velocity around the exit space from the turbine. This vacuum effect can be optimized by utilization of the wind concentration effects around the exit drag curtain relative to the lower velocities present at the inside of the exit drag curtain. The ultimate design for each application will consider the specific drag curtain geometries employed in the outlet section to obtain the most optimal air entrainment mixture rates possible downstream of the exit drag curtain. For example, when more than a 180° exit drag curtain arc is used, the optimum mixture angle might easily be at a 15° straight converging included angle, or, as much as a 0 to 60° straight diverging included angle. Even a "bluff body" diverging angle of up to 180° may be considered in order to obtain the most optimal re-entrainment conditions possible. Extensive physical and math modeling may be required for each application considered to determine the optimal re-entrainment angles for most effective re-mixing or re-entrainment of the two re-combining air streams back into a second phase of the prevailing wind.

The basic principle of a preferred embodiment shown in FIGS. 1A-1B is based on the "S" type or reverse pitot tube type design concept for optimizing and maximizing the velocity head differential achieved from a given air velocity. This type of, probe is especially useful at lower air or gas velocities. For example, the pressure differential from an "S" type pitot tube in an air stream will be higher than for a standard pitot tube where the low pressure tube is oriented only 90° to the air flow direction. Additionally, relatively minor defects in the downstream outlet nozzles outer surface for an "S" type pitot tube are also known to affect the final calibration factor applied to a specific "S" type probe as tested and calibrated in the laboratory.

The structural, mechanical, instrumentation and control and electrical systems that safely and reliably convert the rotational energy output of the vertical air turbine to safe, useable power are well known in the available art and are not a part of this invention.

FIGS. 6A and 6B are another embodiment of the present invention. A generator 611 at ground level is driven by a vertical shaft 614 which is powered by a radial fan 615. The radial fan 615 is driven by air from two phases of the prevailing wind in two stages: one force internal and the other force external to the air turbine assembly. The internal air comes from the flow tube 616 which traps air from the first phase of the prevailing wind 620 in front of the entry air scoop 613 which creates pressure in front of the flow tube 616. The external air comes from the second phase of the prevailing wind 620 blowing across the periphery of the radial fan 615 blades which are designed to utilize both the internal and external air flows in a first and second stage; that is, a first and second stage of air injection to the air turbine. The exhaust air then proceeds to the exit space 618 immediately surrounding the radial fan, and entrains back into the prevailing wind downstream of the invention. In this case, the exit space is defined by the change in air flow direction from a principally radial direction to a prevailing wind direction, rather than being defined by any specific ductwork or equipment geometry. Additional features include a positioning motor 619 to rotate the air scoop 613 and partial exit space drag curtain 621 which is rotated to follow the prevailing wind direction, a safety fence 612, and a brake 617 which can be used to prevent over-speeding of the radial fan. In this case, the safety fence as shown is intended to prevent people and small animals from entering the equipment. The exit space partial drag curtain and exit barrier 621 is an optional feature.

FIGS. 6C, 6D, and 6E show one method of how the air scoop is used in this embodiment. The view is a simplified top view and the air scoop is a fixed geometry 180 degree barrier. The air scoop 613a, 613b, and 613c is rotated as the prevailing wind 620a, 620b, and 620c increases in magnitude. In FIG. 6E the air scoop additionally blocks the air flow so that there is no wind into the flow tube and the equipment protected in a high wind. Another air scoop method is to utilize an air scoop which is adjustable similar to the adjustable drag curtains shown in FIGS. 2G, 2H, 3C, 3E, 3F, and 3G and which are used to both concentrate and direct the flow of air both upwardly and into the flow tube and air turbine section.

Figure 7B:
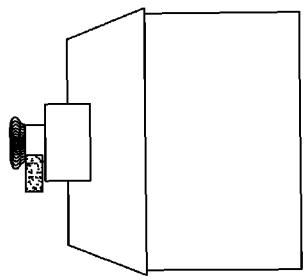
FIGS. 7A-7C shows another embodiment of the present invention installed on a new or existing home or office building roof.
Figure 7C:
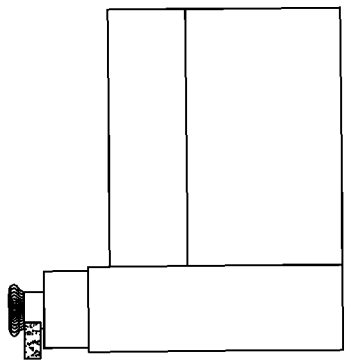
Figure 7A:
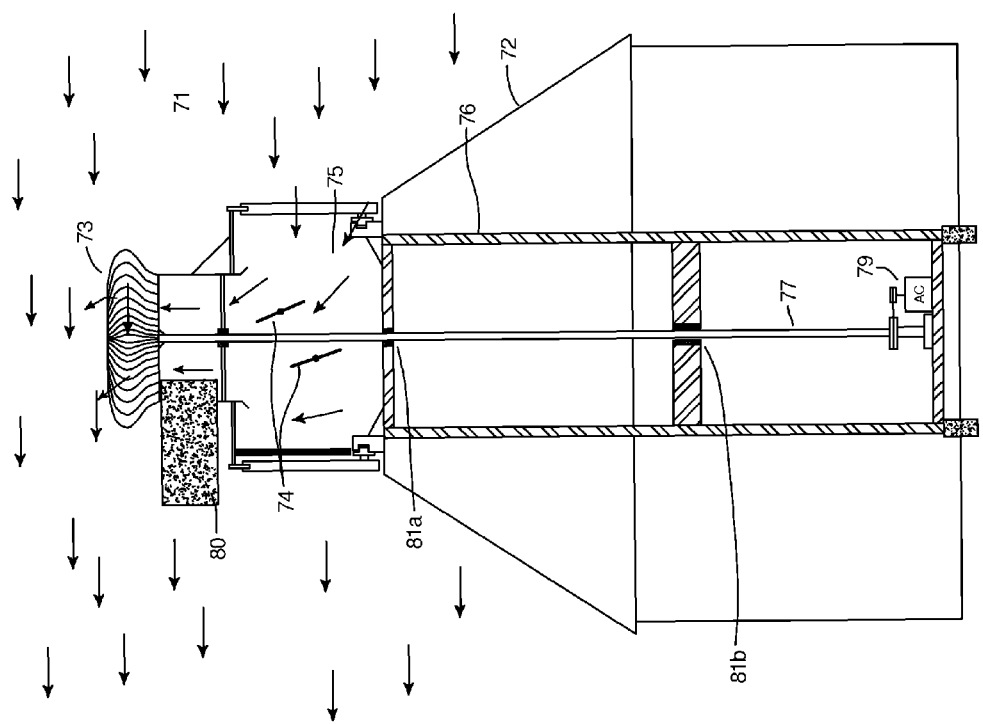

FIG. 7A is another embodiment of the present invention. A radial fan of a wind powered turbine roof vent type air turbine design 73 is installed on a new or "Green" home or office building roof 72 which receives air flow from both a first and second phase of the incoming prevailing wind 71, as discussed previously. An adjustable air scoop 75 directs air flow upwardly into the inner diameter of the air turbine blade assembly, which exhausts outwardly into the exit space immediately surrounding the air turbine. Optional adjustable turning vanes 74 inside the adjustable inlet air scoop provide for enhanced air flow efficiency. Dual stabilizing-counter air foil type wind vanes 80 rotate the adjustable air inlet scoop to keep it oriented to the wind. Only one vane can be seen in this view. An additional plan view in FIGS. 8A-8C shows more clearly the self correcting features of this design as the wind direction changes relative to the air turbine and air scoop inlet sections, as well as depicting more accurately the actual location of the two stabilizing air foils. A steel structure 76 supports the air scoop, the air turbine, and a vertical rotating shaft 77 which transmits the rotating power downward to the electric generator 79. The vertical rotating shaft is preferably a suitably balanced tube, such as a pipe or structural tubing, and may be as much as 12" in diameter. The vertical rotating shaft optionally provides structural support of the air turbine, both radial and vertical. The air turbine may also be supported by the steel structure (not shown) by way of the rotating cage assembly. In this embodiment, the transfer of power between the air turbine and generator is done by a smaller flexible shaft by independently supporting the horizontal wind forces on the air turbine via the rotating cage assembly. The steel structure and rotating shaft are preferably embedded into the walls, floors, and ceilings of a new home or office building and are completely hidden from view. In one embodiment, the roof turbine blades are of a reverse fan type design. Where the vertical rotating shaft goes through the structural supports, suitable bearings and supports 81*a*, 81*b* are utilized.

In FIG. 7A, air flow from the prevailing wind on the turbine blades provides power from two stages of air injection created from two phases of prevailing wind flow as previously discussed. The air scoop is locatable either above or below the air turbine blades, depending upon the choice of the designer. The generator is installable at ground level, in a basement, on a second floor, or just below the roof line, depending upon local conditions, floor layout, and construction costs.

FIGS. 7B and 7C illustrate the installation of the roof mounted system on a new "Green" home or office building and also on an existing home or office building on a retrofit basis respectively. In the case of a retrofit, the installation most favorably would be done by an addition to the original home or office building as shown in FIG. 7C. The structural steel needed to support the wind turbine system and support the wind loads could be easily hidden from view by various combinations of added enclosures to the existing home, such as a garage, storage shed or various room additions. Also, architectural siding could be used as a more cost effective method for concealing the steel support structure, which would provide various lower cost options for a garage, porte-cochere, car port, storage rooms, battery and generator rooms, etc.

A dual stabilizing-counter air foil system as shown in FIGS. 8A, 8B, and 8C works to correct the multi-phased vertical wind turbine system orientation relative to the prevailing wind such that the inlet air scoop faces directly into the wind at all times. This is accomplished by the two opposing air foil type stabilizing fins located toward the rear of the rotatable and supporting cage, structure of the wind turbine system. When the inlet air scoop, is facing directly into the wind, as shown in FIG. 5B, both air foils are at minimum and opposing lifts on a horizontal or side to side basis and thus there is no correctional torque on the support cage to rotate it in either direction.

FIGS. 8A, 8B, and 8C show a self correcting method for automatic re-orientation of the inlet air scoop to always face the prevailing wind by use of two opposing air foils. The use of two air foils 85 provides for a dual stabilizing-counter air foil system design that automatically and continuously corrects the air scoop orientation so that it faces directly into the wind at all times. This is accomplished by the positioning of the two opposing air foil type stabilizing fins towards the rear of the rotatable support cage and air scoop structure where fully exposed to the prevailing wind. When the inlet air scoop is facing directly into the wind as illustrated in FIG. 8B, both air foils are at minimum lift angles to the prevailing wind 86*b*, such that the opposing lifts are minimal. Therefore, there is no correctional torque on the support cage to rotate it in either direction.

When the wind 86*a* shifts relative to the inlet air scoop, as shown in FIG. 8A the lift on the left hand (when viewed from upwind) air foil type stabilizer fin increases significantly, with zero or no lift experienced by the right hand air foil type stabilizer fin. Thus, the rotatable support structure corrects by rotating clockwise until the two stabilizer fins are again balanced and the inlet air scoop is again facing directly into the wind as shown in FIG. 8B. When the wind 86*c* shifts relative to the inlet air scoop, as shown in FIG. 8C, the lift on the right hand air foil type stabilizer fin increases significantly, with zero or no lift experienced by the left hand air foil type stabilizer fin. Thus, the rotatable support structure corrects by rotating, counter-clockwise until the two stabilizer fins are again balanced as shown in FIG. 8B and the inlet air scoop is again facing directly into the wind.

FIGS. 9A-9C, 10 is an embodiment of the present invention where various types of air turbines and air blades are used in a novel method to exploit air flow in a general "S" shaped flow pattern through the power generating system equipment. A vertical configuration is shown, i.e. a vertical rotating axis for the air turbine and air blades, but a horizontal configuration could also be used. Also, passive air dampers are used to direct the air flow based on simple air pressure rather than rotate a flexible air scoop and maintain it's direction into the wind. The passive air dampers are actuated by the prevailing wind, per natural air pressures, and by gravity.

Additionally, deflection dampers may be used to enhance the efficiency of air collection by rotating a surface area into the wind to provide an air scooping surface. In another embodiment, the deflection damper is used in combination with the passive air dampers. It also used as a regulating intake damper when a passive in-flow damper is not used. If a deflection damper is used with an out flow air movement, it is used to provide an enhanced air drag effect.

Figure 9A:
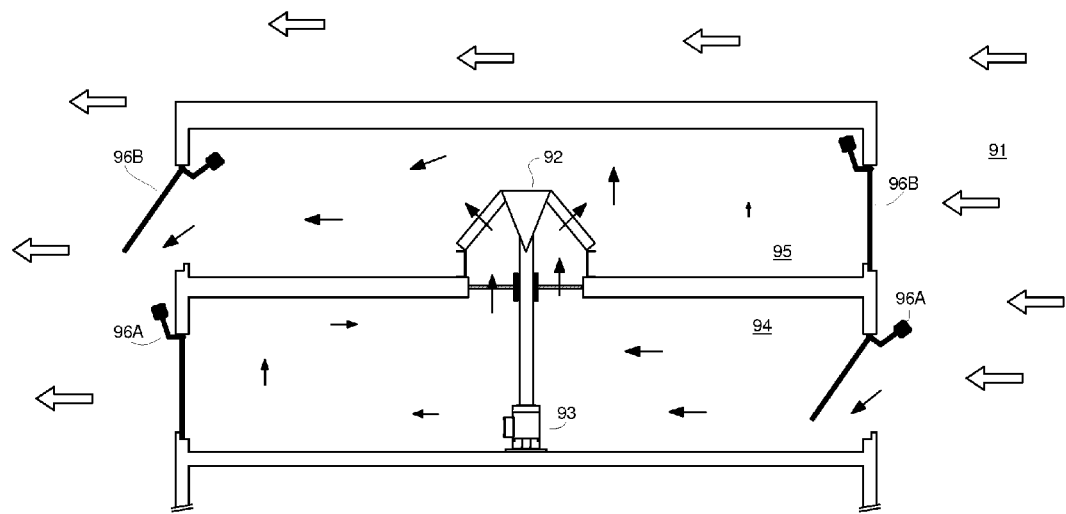

In FIG. 9A, a cross section, the prevailing wind is directed toward the power generating equipment which may be installed on a building where the prevailing wind 91 is available. Common locations are roof tops and upper stories of a building. Air flow from the prevailing wind opens an in-flow damper 96A which is counter weighted, (also referred to as barometrically balanced), and enters lower chamber 94. A generator 93 is connected to a Full, Mixed-Outflow type Air Blade design which incorporates an air foil blade design 92. The air flows through a structural divider between the lower chamber 94 and the upper chamber 95 and thereby creates power. The air then passes through the out-flowing damper 96B which is counter weighted, (also referred to as barometrically balanced). The power generating air flow then re-enters the prevailing wind on the downwind (or downstream) side of the building. Power is generated by utilizing the pressure differential and air flow created by the prevailing wind impact and drag effects around the building surfaces.

Preferably, the in-flowing dampers 96A and the out-flowing dampers 96B are designed to be as passive as possible and maintenance free. Sensors are optionally used, if required, to improve performance, and dampen any unnecessary movement by gradual repositioning any active dampers. It is highly desirable that any dampers related to air flow do not cause a pressure drop for the air flow, nor that they 'slam' open and closed. To that end, shock absorbers, and common anti rapid movement devices may be employed with success. The dampers only need to create a reasonable seal when closed, so that the power generation is optimized.

The number of passive dampers that are open and closed are naturally selecting based on gravity and the prevailing wind direction around the perimeter of the lower and upper chambers. The number of dampers used for an application is selectable for each particular design, based on power requirements and capital cost.

The location of the air blades (i.e. air turbine) and their orientation are chosen based on design criterion for power and maintenance. In general, the blades must be located to efficiently utilize the pressure differential generated between the upper and lower chambers. The air blades are preferably rotating about a vertical or horizontal axis. Careful attention must be paid to ensure minimal pressure losses. The air blades may be located in the lower chamber 94, the upper chamber 95, in-between, or partially in each. It is also possible to locate the air blades externally to both chambers.

Figure 9B:
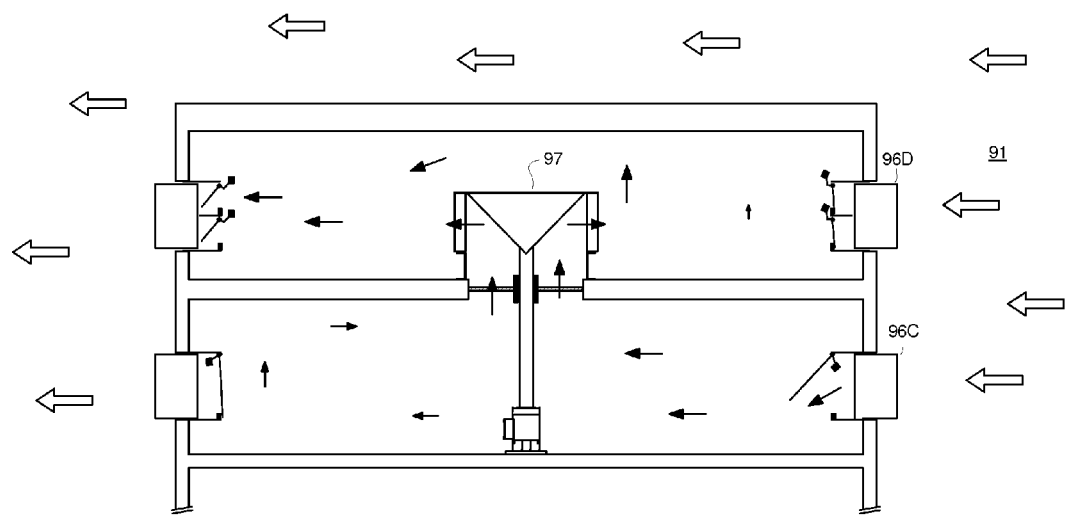

FIG. 9B is similar to FIG. 9A except a Full Radial-Outflow type Air Turbine which incorporates an Air Foil type Air Blade design 97 is used. In this case the inflow air dampers are combined with air deflecting dampers 96C, as already mentioned, and the outflow passive air dampers are combined with air deflecting dampers 96D. The figure could also be shown with only air deflecting dampers 96C and 96D and the passive air dampers omitted. In this case, a control system would be needed to provide optimum power efficiency to ensure the correct dampers are open and closed for air intake and outflow. The air deflecting dampers are useful for buildings that are oddly shaped and to ensure optimum power generation. The air deflection dampers have a significant in surface area, and are preferably designed for a particular location. It should be noted that FIG. 9B is not to scale, and the visual size of the air deflecting dampers 96C and 96D are only illustrative.

Figure 9C:
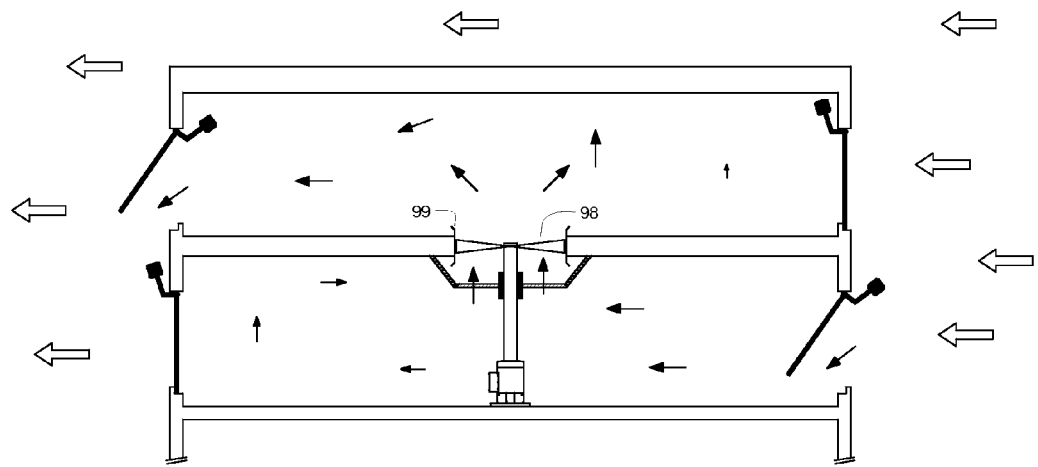

FIG. 9C is similar to FIG. 9A except a Axial Flow-Propeller type Air Turbine with Air Foil type Air Blades design 98 is used and a flow tube 99 is also shown.

Figure 10:
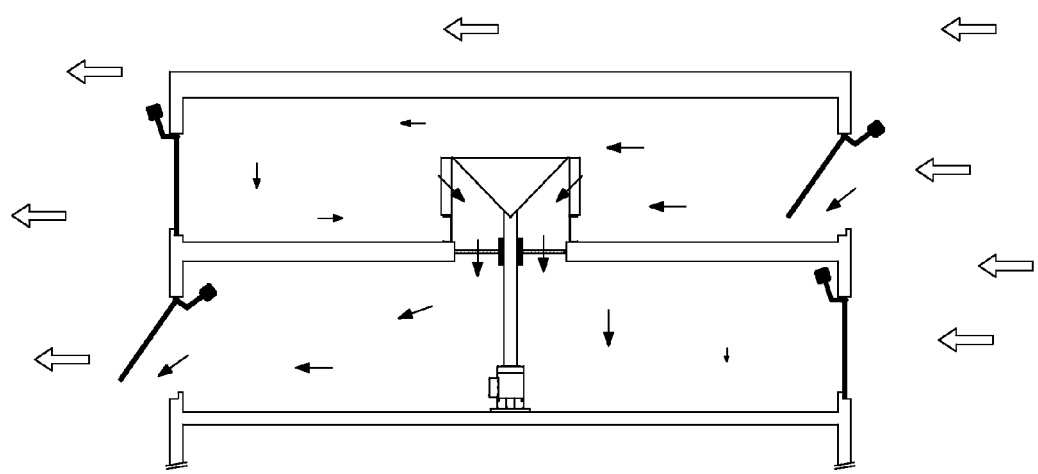

FIG. 10 is similar to FIG. 9B except the in-flow and out-flow dampers are reversed in their direction of opening so that the air flow through the system is reversed, using a Full, Radial-Inflow type air turbine design with air blades that are designed for high efficiency.

FIG. 11 is similar to FIG. 9B except that the upper chamber is removed, the lower chamber remains 1103, and the upper air blades 1102 are designed to additionally provide power by use of a second phase of the prevailing wind 1101.

Alternately, dampers, shutters, or curtains (open 1104 and closed 1105) are used to control the in-flow air as shown in amended FIGS. 11A and 11B. The fixed structure (1107a and 1107b) with optional screened-in enclosure (1108a and 1108b) is installed relative to a roof of a building at one of two levels 1106a and 1106b.

FIG. 12 shows an embodiment of the present invention where the power generating equipment and assembly is mounted on top of, or near the upper rooms of a building 1205, such as a home or small office. A unique and novel method of orienting the air scoop toward the prevailing wind 1201 is shown. The air scoop 1206, air turbine 1209, and generator 1210 are all mounted in an enclosure where the air blades rotate about a separate vertical axis 1207. A separate orienting axis 1203 which runs down the center of a main support pole 1204 to the ground 1211 is used to orient the enclosure. An assembly of bearings and mounting brackets 1212 are mounted at the top of the support pole which is connected by supports to the assembly enclosure for the power generating equipment. The offset amount 1213, or distance between the two axis 1207 and 1203 then allows the prevailing wind to generate a pivoting force that rotates the assembly enclosure around the orienting axis 1203 to a position downwind of the orienting axis. Additionally, a screen or grate 1208 or is used after the air blades to prevent animals or birds from entering the exit space around the air blades. A barrier 1202 is used to define the exit space and partially or completely blocks the prevailing wind from entering it.

FIG. 13 is another embodiment of the present invention where the flow is staged on a roof in a split air turbine (or split air blade) design. There are two air blade assemblies (or air turbines) and the air is heated in between the lower air blades and the upper air blades to provide a velocity boost. The heat provides an increased pressure differential across, the entire system from the inlet to the outlet, as well as through the upper air blades or air turbine assembly. The heat is preferably solar, but may additionally be from other sources that include fossil fuels, preferably clean burning fossil fuels. In this embodiment, the prevailing wind 1301 impinges on the power generation assembly which is mounted on a roof top 1302, or near the upper portion of a building where there is available prevailing wind air flow. The electrical generator 1303 is driven by a main power shaft 1304 which runs upwardly through the split air blade (or air turbine) design. A flow tube 1305 directs air from the prevailing wind through the lower air blades 1306 and then upwardly through a heat exchanger 1308 which is fed by a heated fluid from solar panels 1309 and lower piping. An initial heating surface 1307 in the flow tube is shown. Alternately, the exterior of the vertical air flow between the split air blade design could be insulated and the heat exchanger between the split air blades could be heated by another source, such as fossil fuel or waste building heat. The air flow is then directed upwardly toward the upper air blades 1311, and then outwardly into the prevailing wind. An upper support 1310 is provide for the main power shaft to steady it. The support is designed to allow free air flow.

The waste building heat could come from sources such as heating and air conditioning, hot water heating, kitchens and laundries, existing blowers/exhausters/air movers, other building heat sources, available steam being vented, etc.

In this embodiment, the additional pressure differential created by the chimney effect drives the air flow, but the externally heated air flow which enters the top chamber 1312 is optionally used to create an induced draft.

In another embodiment, the heat put into the vertical moving air comes from secondary air sources within the building that has heat in them and the secondary air is directly injected into the vertical moving air. Thus, the heat in the vertical moving air is indirect (heat exchanger) or direct (injected).

While various embodiments of the present invention have been described, the invention may be easily modified and adapted to suit various air turbines of either an existing or new design and as may be developed by those most skilled in the art. Therefore, this invention is not limited to the description and figures as shown herein, and includes all such embodiments, changes, and modifications that are encompassed by the scope of the claims.

What is claimed is:

1. An enhanced multi-phased vertical axis wind power generating system comprising:
   a. a power generating turbine, wherein said power generating turbine incorporates air blades that rotate about said vertical axis,
   b. a chamber, wherein said chamber is surrounded by a fixed and open structure,
   c. wherein said chamber receives air flow by a positive pressure created from a prevailing wind, wherein said positive pressure generates air flow from said-chamber into said air blades,
   d. a flow tube, wherein said flow tube directs air flow from said chamber into said air blades,
   e. wherein air flows from said chamber through said air blades, and
   f. wherein said air blades are configured such that a second phase of the prevailing wind directly impacts at least a portion of said air blades,
   whereby said power generating system creates useful power from the prevailing wind.

2. The power generating system according to claim 1, wherein the chamber is configured as a lower chamber.

3. The power generating system according to claim 1, wherein the chamber is configured as an upper chamber.

4. The power generating system according to claim 1, wherein said fixed structure is integrally coupled to a roof.

5. The power generating system according to claim 1, further comprising passive in-flow air dampers, shutters or curtains, wherein said passive in-flow air dampers, shutters or curtains are configured on said chamber and are configured to open and close as a function of the prevailing wind.

6. The power generating system according to claim 1, wherein said power generating turbine incorporates an air foil type air blade.

7. The power generating system according to claim 6, wherein said power generating turbine incorporates a modified air foil type air blade design configured for multi-phased wind operation and performance.

8. The power generating system according to claim 1, further comprising an inlet air scoop.

9. The power generating system according to claim 8 wherein said inlet air scoop is configured within the chamber and is configured to rotate.

10. The power generating system according to claim 9, wherein said inlet air scoop is configured to passively rotate so as to face into the wind as a function of the prevailing wind direction.

11. The power generating system according to claim 9, wherein said inlet air scoop is configured at an offset to the said vertical axis and is configured to passively rotate so as to face into the wind as a function of the prevailing wind direction.

12. The power generating system according to claim 1, further comprising at least one exit barrier.

13. The power generating system according to claim 12, wherein at least one exit barrier is adjustable.

14. The power generating system according to claim 12 wherein at least one exit barrier is a drag curtain.

15. The power generating system according to claim 12, wherein at least one exit barrier is a prevailing wind concentrator.

16. The power generating system according to claim 12, wherein at least one exit barrier is a blocking barrier, wherein the blocking barrier is configured to shield at least a portion of the air turbine from direct impact of the prevailing wind.

17. The power generating system according to claim 12, wherein at least one exit barrier and an exit space around said air blades are surrounded by a fence.

18. The enhanced multi-phased vertical axis wind power generating system comprising of claim 12, wherein drag of the prevailing wind past said exit barrier creates additional power from a portion of the prevailing wind that flows past said power generating turbine.

19. The enhanced multi-phased vertical axis wind power generating system comprising of claim 12, wherein at least a portion of the power generating turbine serves as an exit barrier or drag curtain.

20. The enhanced multi-phased vertical axis wind power generating system of claim 1, further comprising secondary air blades configured about the vertical axis and within said flow tube, whereby air flowing through said flow tube propels said secondary air blades.

21. The enhanced multi-phased vertical axis wind power generating system of claim 20, further comprising a heat exchanger configured between said secondary air blades and said power generating turbine incorporating air blades, wherein said heat exchanger heats air flowing through it.

22. An enhanced multi-phased vertical axis wind power generating system comprising:

a. a power generating turbine, wherein said power generating turbine incorporates air blades that rotate about said vertical axis, wherein said air blades are configured such that a second phase of the prevailing wind directly impacts at least a portion of said air blades, b. a lower chamber, wherein said chamber is surrounded by a fixed structure, wherein said lower chamber receives air flow by a positive pressure created from a prevailing wind, wherein said positive pressure generates air flow from said-chamber into said air blades, d. a flow tube, wherein said flow tube directs air flow from said chamber into said air blades, and e. a passive in-flow air dampers, shutters or curtains, wherein said passive in-flow air dampers are configured on said chamber and are configured to open as a function of the prevailing wind, wherein air flows from said chamber through said air blades whereby said power generating system creates useful power from the prevailing wind, and wherein said fixed structure is integrally coupled to a roof.

* * * * *